US010380044B2

(12) United States Patent
Kobayashi et al.

(10) Patent No.: US 10,380,044 B2
(45) Date of Patent: Aug. 13, 2019

(54) CONTROL APPARATUS, STORAGE APPARATUS AND COMPUTER-READABLE RECORDING MEDIUM HAVING STORED THEREIN CONTROL PROGRAM

(71) Applicant: FUJITSU LIMITED, Kawasaki-shi, Kanagawa (JP)

(72) Inventors: Kenji Kobayashi, Kawasaki (JP); Koutarou Nimura, Kawasaki (JP); Yoshihito Konta, Kawasaki (JP); Marie Abe, Kawasaki (JP); Masatoshi Nakamura, Machida (JP); Tomo Fukui, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 15/068,670

(22) Filed: Mar. 14, 2016

(65) Prior Publication Data
US 2016/0321198 A1 Nov. 3, 2016

(30) Foreign Application Priority Data

Apr. 30, 2015 (JP) ................................. 2015-093636

(51) Int. Cl.
*G06F 13/40* (2006.01)
*G06F 13/16* (2006.01)
(Continued)

(52) U.S. Cl.
CPC ........ *G06F 13/1668* (2013.01); *G06F 3/0622* (2013.01); *G06F 3/0653* (2013.01);
(Continued)

(58) Field of Classification Search
None
See application file for complete search history.

(56) References Cited

U.S. PATENT DOCUMENTS 7,395,393 B2 * 7/2008 Shiraki ............... G06F 21/6227
710/36
7,844,044 B2 * 11/2010 Batni ................ H04M 3/42017
379/219
(Continued)

FOREIGN PATENT DOCUMENTS

JP 7-152491 A 6/1995
JP 2006-155392 6/2006
(Continued)

OTHER PUBLICATIONS

Japanese Office Action dated Oct. 2, 2018 for corresponding Japanese Patent Application No. 2015-093636, with English Abstract, 6 pages.

*Primary Examiner* — Elias Mamo
(74) *Attorney, Agent, or Firm* — Fujitsu Patent Center

(57) ABSTRACT

A control apparatus served as a first control apparatus includes a first information storage unit configured to store therein coupling information relating to a coupling relationship between a plurality of control apparatus and a plurality of devices, the plurality of control apparatus including the first control apparatus and controlling access to the plurality of devices, and a processor. The processor specifies, in response to a first access request to a first device from among the plurality of devices, a second control apparatus responsible for the first device based on the coupling information stored in the first information storage unit, and issues an instruction to access to the first device based on the first access request received by the first control apparatus to the specified second control apparatus through a relay apparatus that relays information to be transferred between the plurality of control apparatus.

20 Claims, 15 Drawing Sheets

(51) Int. Cl.
 *G06F 3/06* (2006.01)
 *G06F 13/28* (2006.01)
(52) U.S. Cl.
 CPC ............ *G06F 3/0683* (2013.01); *G06F 13/28* (2013.01); *G06F 13/4068* (2013.01)

(56) References Cited

U.S. PATENT DOCUMENTS

| | | | |
|---|---|---|---|
| 9,454,416 B2* | 9/2016 | Veluswamy | G06F 11/008 |
| 2002/0172195 A1* | 11/2002 | Pekkala | H04L 12/6418 |
| | | | 370/352 |
| 2005/0044284 A1* | 2/2005 | Pescatore | G06F 13/4009 |
| | | | 710/15 |
| 2005/0232285 A1* | 10/2005 | Terrell | H04L 67/1097 |
| | | | 370/401 |
| 2007/0180045 A1 | 8/2007 | Sato | |
| 2008/0075096 A1* | 3/2008 | Wagner | H04L 29/12509 |
| | | | 370/401 |
| 2010/0332778 A1 | 12/2010 | Wada | |

FOREIGN PATENT DOCUMENTS

| JP | 2007-200171 | 8/2007 |
|---|---|---|
| JP | 2008-171420 | 7/2008 |
| JP | 2011-13800 | 1/2011 |

\* cited by examiner

FIG. 6

EXAMPLE OF DISK GROUP
INFORMATION  ⬐420

| RAID GROUP NUMBER | RAID GROUP #00 |
|---|---|
| RAID LEVEL | RAID1 |
| NUMBER OF CONFIGURATION DISKS | 2 |
| CONFIGURATION DISK | DE#00 Slot#00 |
|  | DE#10 Slot#01 |
| NUMBER OF LUNS | 2 |
| LUN NUMBER | LUN#00 |
|  | LUN#01 |

FIG. 7

EXAMPLE OF LOGICAL VOLUME
INFORMATION  ~ 430

| LUN NUMBER | LUN#00 |
|---|---|
| RAID GROUP NUMBER | RAID GROUP #00 |
| HOST I/F (CA) | CE#00 CM#00 CA#00 |
|  | CE#01 CM#00 CA#00 |

| LUN NUMBER | LUN#01 |
|---|---|
| RAID GROUP NUMBER | RAID GROUP #00 |
| HOST I/F (CA) | CE#00 CM#00 CA#00 |
|  | CE#01 CM#00 CA#00 |

CONTROL APPARATUS, STORAGE APPARATUS AND COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent Application No. 2015-093636, filed on Apr. 30, 2015, the entire contents of which are incorporated herein by reference.

FIELD

The present embodiment relates to a control apparatus, a storage apparatus, and a computer-readable recording medium having stored therein a control program.

BACKGROUND

A storage apparatus is known in which a plurality of housings are incorporated and which provides storage regions of the storage devices to a host apparatus. The storage apparatus may include a plurality of storage devices such as a Hard Disk Drive (HDD) or a Solid State Drive (SSD). Further, in such a storage apparatus as just described, a plurality of control apparatus that perform access control between the host apparatus and the storage devices are provided.

FIG. 15 is a view depicting an example of a configuration of a storage apparatus 100. The storage apparatus 100 may include a plurality of Drive Enclosures (DEs) 500-0 to 500-31 individually including a plurality of storage devices 510, and a plurality of Controller Modules (CMs) 400-0 to 400-7 provided between a host apparatus and the storage devices 510. It is to be noted that the CMs 400-0 to 400-7 are provided in a control housing such as a single Controller Enclosure (CE) 300 or the like.

Where the plurality of components are not distinguished from each other in the following description, the components are denoted omitting a numerical character after the hyphen "-" of any reference character. For example, where the CMs 400-0 to 400-7 are not distinguished from each other, each of the CMs is represented simply as CM 400.

The CMs 400 are coupled for mutual communication with the host apparatus through a plurality of Channel Adapters (CAs) 400a, and are coupled with the plurality of DEs 500 through a plurality of Input Output Controllers (IOCs) 400b. Further, the CMs 400 are coupled with two redundant Front End Routers (FRTs) 200-0 and 200-1, and can achieve synchronization of configuration information or the like for the apparatus among the CMs 400 and may issue a request for a process to some other CM 400 or the like through the FRT 200.

A plurality of redundant Back End Routers (BRTs) 600-0 to 600-7 are interposed between the plurality of IOCs 400b provided in each of the CMs 400 and the DEs 500. The BRTs 600 are coupled with all of the CMs 400 and are coupled with all of the DEs 500. It is to be noted that a cable for coupling the BRTs 600, IOCs 400b and DEs 500 with each other may be redundant.

Consequently, each of the BRTs 600 may selectively change over a path between an IOC 400b that is an access source or destination and a DE 500 that stores a storage device 510 that is an access destination or source. Accordingly, by the BRT 600, information such as a command or data to be transferred between the IOC 400b and the storage device 510 that is an access destination may be transferred by changing over the path to a suitable path.

In this manner, in the storage apparatus 100 exemplified in FIG. 15, a plurality of apparatus, a plurality of cables and so forth of the same type are provided to make the apparatus, paths between the apparatus and so forth redundant, by which enhancement of availability and a performance of the system can be achieved.

For example, the plurality of CMs 400 and the plurality of storage devices 510 (plurality of DEs 500) are directly connected to each other through the redundant BRTs 600, and any of the CMs 400 can access a desired storage device 510.

[Patent Document 1] Japanese Laid-Open Patent Application No. 2006-155392

[Patent Document 2] Japanese Laid-Open Patent Application No. 2011-13800

[Patent Document 3] Japanese Laid-Open Patent Application No. 2008-171420

[Patent Document 4] Japanese Laid-Open Patent Application No. 2007-200171

However, in the described storage apparatus 100 described above, the number of cables and BRTs 600 for coupling the CMs 400 and the DEs 500 increases as the scale of the storage apparatus increases, and the cost upon introduction of the storage apparatus 100 or extension of the CMs 400 or the DEs 500 may possibly increase.

Further, it is assumed that, in the storage apparatus 100, all paths in the BRTs 600 are valid. Therefore, for example, when a CM 400 is newly added (extended), the extended CM 400 and all of the BRTs 600 are connected to each other. Further, when a DE 500 is newly added (extended), also a BRT 600 is newly extended as occasion demands and the extended BRT 600 and all of the CMs 400 are connected to each other.

In this manner, from a point of view that the cost increases or extending work is complicated, the storage apparatus 100 is sometimes not suitable for operation in which a CM 400 or a DE 500 is expanded (extended) (not suitable for scale-out).

SUMMARY

According to an aspect of the embodiments, a control apparatus served as a first control apparatus includes a first information storage unit configured to store therein coupling information relating to a coupling relationship between a plurality of control apparatus and a plurality of devices, the plurality of control apparatus including the first control apparatus and controlling access to the plurality of devices. The control apparatus served as the first control apparatus further includes a processor. The processor specifies, in response to a first access request to a first device from among the plurality of devices, a second control apparatus responsible for the first device based on the coupling information stored in the first information storage unit. Further, the processor issues an instruction to access to the first device based on the first access request received by the first control apparatus to the specified second control apparatus through a relay apparatus that relays information to be transferred between the plurality of control apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a view depicting an example of disk group information depicted in FIG. 5;

FIG. 7 is a view depicting an example of logical volume information depicted in FIG. 5;

DESCRIPTION OF EMBODIMENTS

Figure 1:
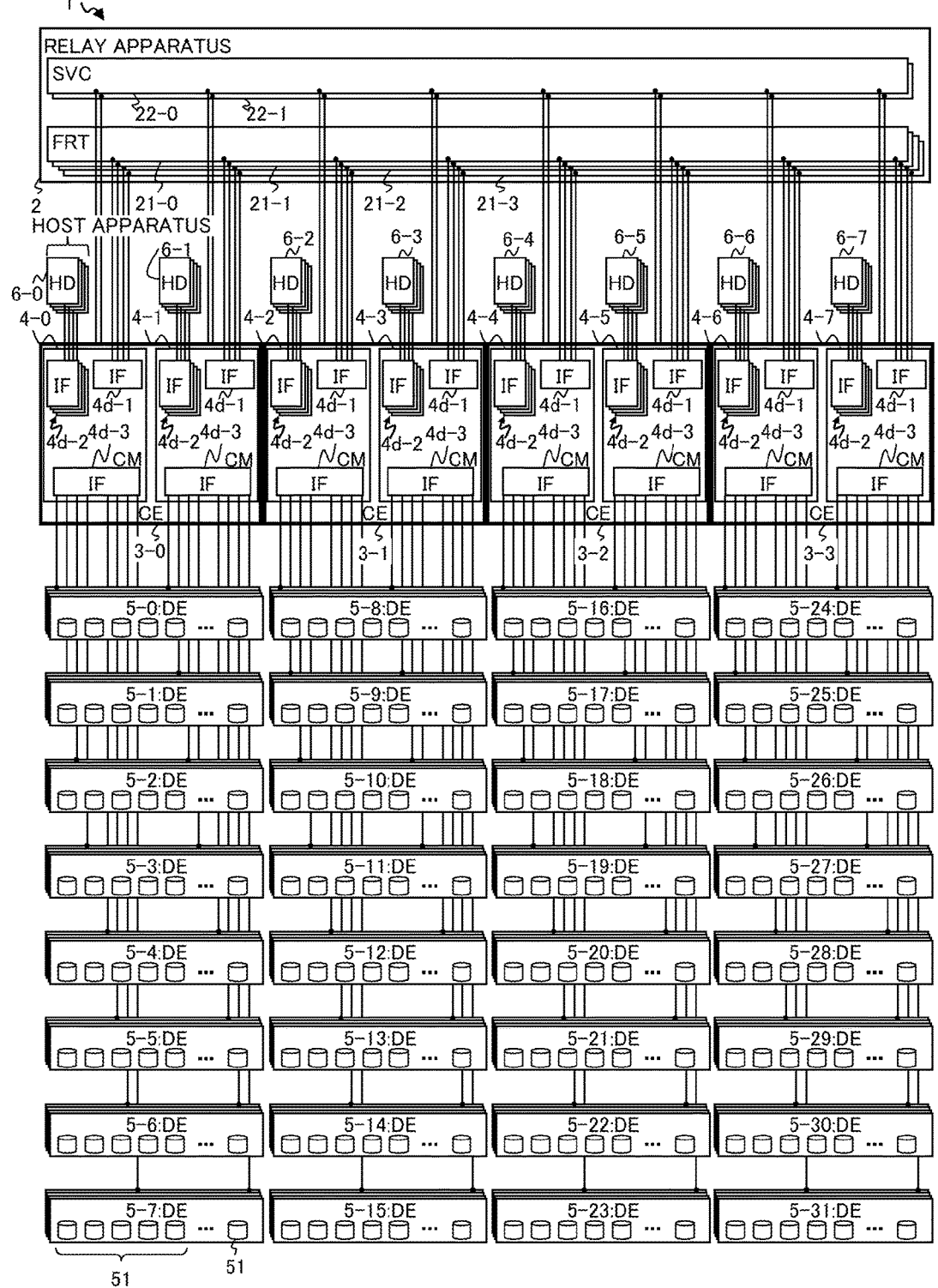
FIG. 1 is a view depicting an example of a configuration of a storage apparatus as an example of an embodiment.

In the following, an embodiment of the present disclosure is described with reference to the drawings. However, the embodiment hereinafter described is illustrative to the end, and there is no intention to eliminate various modifications and applications of the technique not presented explicitly in the following description. In other words, the embodiment can be carried out in various modified forms without departing from the scope thereof. It is to be noted that, unless otherwise specified, like elements to those in the drawings used in the embodiment described below are denoted by like reference characters.

[1] Embodiment

[1-1] Example of Configuration of Storage Apparatus

FIG. 1 is a view depicting an example of a configuration of a storage apparatus 1 as an example of an embodiment. As depicted in FIG. 1, the storage apparatus 1 may exemplarily include a relay apparatus 2, one or more (in FIG. 1, four) CEs 3-0 to 3-3 and a plurality of DEs 5-0 to 5-31. It is to be noted that, where a plurality of components are not distinguished from each other in the following description, the components are described omitting a numerical character after the hyphen "-" of reference characters. For example, where the CEs 3-0 to 3-3 are not distinguished, each CE is represented simply as CE 3.

In the storage apparatus 1, a plurality of storage devices 51 may be incorporated in the DE 5 and a storage region of the storage devices 51 may be provided to a host apparatus 6. For example, the storage apparatus 1 may store data in a dispersed or redundant state into the storage devices 51 using Redundant Arrays of Inexpensive Disks (RAID). It is to be noted that the CE 3 may include such storage devices 51.

The DE 5 is an example of an apparatus that includes a plurality of storage devices 51 and performs various kinds of access of writing, reading out and so forth of data or the like into or from the storage device 51 in response to a request from a CE 3 (CM 4). It is to be noted that, while it is depicted in the example of FIG. 1 that each of the DEs 5-0 to 5-31 is configured as one DE 5 in which four DEs are grouped (collected), the four DEs in one group in each of the DEs 5 may be coupled in cascade (cascade connection) with each other. In other words, the storage apparatus 1 may incorporate a plurality of (for example, thirty-two) sets (DEs 5) of the DEs at a plurality of stages (for example, four stages) in cascade connection therein.

It is to be noted that the DE 5 may include an Input Output Module (IOM) (not depicted) as an example of a controller that performs control of access to the belonging storage devices 51, confirmation of survival or the like. The IOM may generally control the DE 5, and may execute a process as a switch apparatus that relays data between the CMs 4 (for example, in the case of the DE 5-0 of FIG. 1, CMs 4-0 to 4-1) coupled with the own DE 5 and the storage device 51. As an example of such a switch apparatus as just described, a SAS expander is available. The SAS is an abbreviation of Serial Attached SCSI (Small Computer System Interface). Further, the IOM may be coupled with the IOM of other DEs 5.

The storage device 51 is an example of hardware that stores various kinds of data, programs and so forth. As the storage device 51, various storage devices such as, for example, a magnetic disk device such as an HDD and a semiconductor drive device such as an SSD are available.

The CE 3 is an example of a control housing that is coupled with the relay apparatus 2 and the DEs 5 and performs various kinds of control. The CE 3 may include a plurality of CMs 4. In FIG. 1, an example is depicted in which the CE 3 includes two CMs 4.

The CM 4 is an example of a control apparatus (controller) or an information processing apparatus (computer) that controls access from the host apparatus 6 to the plurality of storage devices 51.

In the example of FIG. 1, the CM 4 according to the embodiment is redundant (for example, duplexed) between other CMs 4 in the CE 3. The CMs 4 may be coupled with each other by a cable such as, for example, an SAS.

Each of the CMs 4 in the CE 3 may be coupled directly or indirectly with the DEs 5 corresponding to the CE 3, and a redundant configuration of an access path can be achieved. As an example, in FIG. 1, each of the CMs 4-0 and 4-1 in the CE 3-0 may be coupled directly by a cable such as an SAS with the DEs 5-0 to 5-7, and may be coupled indirectly by a cable such as an SAS with the DEs at the second and following stages in cascade connection from among the DEs 5-0 to 5-7.

Further, the plurality of CMs 4 in the storage apparatus 1 may perform sharing (synchronization), issuance of a notification and so forth of information relating to control of the storage apparatus 1, access to the plurality of storage devices 51 or the like by performing mutual communication of information thereamong (hereinafter referred to as inter-CM information communication).

It is to be noted that, since the CEs 3-0 to 3-3 may be configured so as to have a similar configuration and the CMs 4-0 to 4-7 may be configured so as to have a similar configuration, the embodiment is described below taking an arbitrary CM 4 as an example. Details of the CM 4 are hereinafter described.

The relay apparatus 2 is an example of an apparatus that couples the plurality of CMs 4 for communication with each other and relaying information to be transferred to and from each other among the plurality of CMs 4. The relay apparatus 2 exemplarily includes a plurality of (in FIG. 1, four) redundant FRTs 21-0 to 21-3 and a plurality of (in FIG. 1, two) redundant Service Controllers (SVCs) 22-0 to 22-1.

The FRT 21 is an example of a coupling unit that couples the plurality of CMs 4 for communication with each other. The FRT 21 may include a plurality of adapters in compliance with, for example, Peripheral Component Interconnect (PCI) Express (PCIe) so as to be coupled with the plurality of CMs 4 each through cables corresponding to PCIe or the like.

The SVC 22 is an example of a monitoring unit or an information processing apparatus (computer) that performs monitoring of the storage apparatus 1. Further, the SVC 22 may perform power supply control, for example, control of on/off of the power supply, for the plurality of CEs 3 or the like. The SVC 22 may include, for example, a plurality of interfaces that couple with the CMs 4 so as to be coupled with the plurality of CMs 4 each through a cable or the like. It is to be noted that the SVC 22 may perform monitoring and power supply control relating also to the other components of the storage apparatus 1.

The host apparatus (Host Device; HD) 6 is an example of an upper apparatus coupled with the plurality of CMs 4. The host apparatus 6 may issue an access request for performing various kinds of access to the plurality of DEs 5 (storage devices 51) to the CM 4 selected based on logical volume information 430 (refer to FIG. 7) hereinafter described.

It is to be noted that, while illustration is omitted in the example of FIG. 1, the host apparatus 6 may be coupled with the plurality of CMs 4 through a switch that changes over a path between the host apparatus 6 and the plurality of CMs 4, a network such as a Local Area Network (LAN) or the Internet or the like.

Further, in the example of FIG. 1, the plurality of host apparatus 6-0 to 6-7 are coupled with the corresponding CMs 4-0 to 4-7, respectively. Further, each of the host apparatus 6-0 to 6-7 is indicated as a single host apparatus 6 in which four host apparatus are collected in a group, and the four host apparatus collected in a group are coupled with the CM 4. In this manner, while the example is depicted in FIG. 1 in which the plurality of host apparatus 6 are coupled with the storage apparatus 1, the configuration of them is not limited to this.

For example, at least one host apparatus 6 may be coupled with the storage apparatus 1 through a plurality of redundant paths. For simplification of the description, it is assumed in the following description that one host apparatus 6 that issues an access request to the CM 4 is provided.

It is to be noted that the storage apparatus 1 may include, for example, a rack for incorporating the relay apparatus 2, CEs 3 and DEs 5 described above therein such that the relay apparatus 2, CEs 3 and DEs 5 are incorporated for insertion into and removal from the rack.

Details of the CM 4 in the storage apparatus 1 are described below.

[1-2] Example of Hardware Configuration of CM

Figure 2:
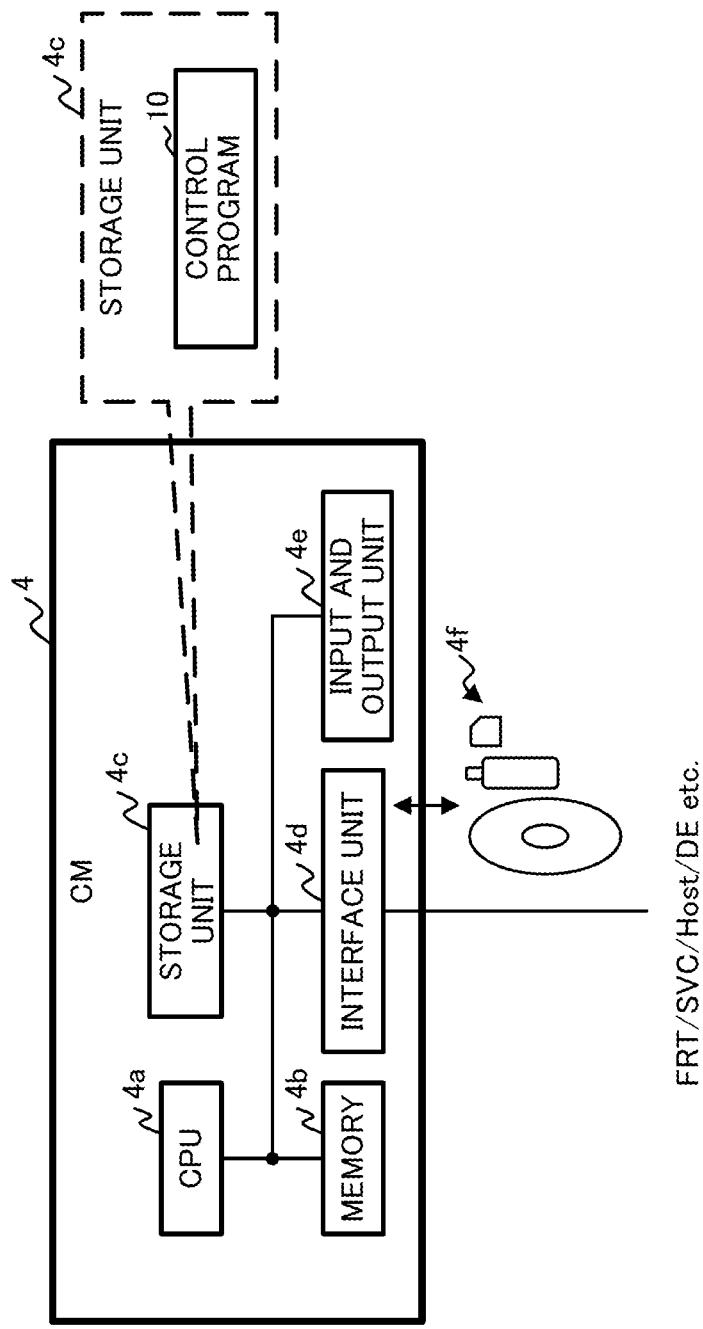
FIG. 2 is a view depicting an example of a hardware configuration of a CM.
Figure 3:
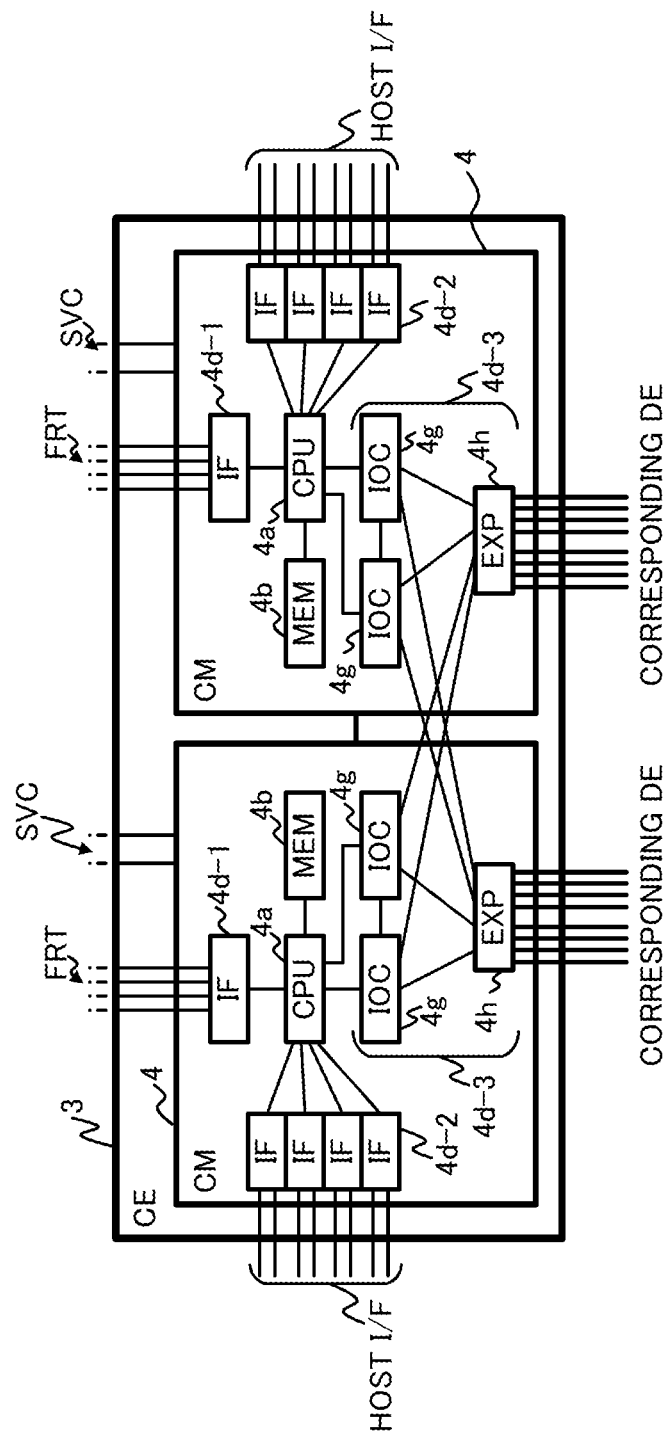
FIG. 3 is a view depicting an example of a hardware configuration focusing on an interface of the CM.

First, an example of a hardware configuration of the CM 4 depicted in FIG. 1 is described with reference to FIGS. 1 to 3. FIG. 2 is a view depicting an example of a hardware configuration of the CM 4, and FIG. 3 is a view depicting an example of a hardware configuration focusing on an interface of the CM 4. As depicted in FIG. 2, the CM 4 may exemplarily include a Central Processing Unit (CPU) 4a, a memory 4b, a storage unit 4c, an interface unit 4d and an input and output unit 4e.

The CPU 4a is an example of an arithmetic processing apparatus (processor) that performs various kinds of control and arithmetic operation. The CPU 4a may be coupled for communication with the blocks in the CM 4 through a bus. It is to be noted that, as an arithmetic processing apparatus, in place of the CPU 4a, an electronic circuit, an Integrated Circuit (IC) such as, for example, a Micro Processing Unit (MPU), an Application Specific Integrated Circuit (ASIC), or a Field Programmable Gate Array (FPGA) may be used.

The memory 4b is an example of hardware that stores various kinds of data and programs therein. The memory 4b may be used as a cache memory that temporarily stores data or a program to be used for access to the DE 5 or the like. As the memory 4b, a volatile memory such as, for example, a Random Access Memory (RAM) is available.

The storage unit 4c is an example of hardware that stores various kinds of data and programs therein. As the storage unit 4c, various kinds of storage devices such as, for example, a magnetic disk device such as an HDD, a semiconductor drive device such as an SSD, a nonvolatile memory such as a flash memory or a Read Only Memory (ROM) are available.

For example, the storage unit 4c may store a control program 10 for implementing all or part of various functions of the CM 4. The CPU 4a may implement the functions of the CM 4 by developing and executing the control program 10 stored, for example, in the storage unit 4c in the memory 4b.

The interface unit 4d is an example of a communication interface that performs control and so forth of coupling and communication with a host apparatus 6, a DE 5, a CM 4 in a different CE 3 (through the FRT 21 of the relay apparatus 2), some other CM 4 in a CE 3, a SVC 22, a working terminal of an operator and so forth. For example, the interface unit 4d may include an adapter (port) that couples the IF 4d-1 to 4d-3 depicted in FIGS. 1 and 3 or a working terminal. It is to be noted that the control program 10 may be downloaded from a network not depicted through the interface unit 4d.

In the example depicted in FIGS. 1 and 3, the IF 4d-1 is an example of a communication interface that performs control and so forth of coupling and communication with the relay apparatus 2. As the IF 4d-1, for example, a Non Transparent Bridge (NTB) including an adapter in compliance with PCIe or the like is available.

The IF 4*d*-2 is an example of a communication interface (host interface) that performs control and so forth of coupling and communication with the host apparatus. As the IF 4*d*-2, for example, a CA including an adapter in compliance with a LAN, Storage Area Network (SAN), Fibre Channel (FC), InfiniBand or the like is available. The IF 4*d*-2 may be coupled with the host apparatus 6 through a cable or the like in compliance with the standards just described. It is to be noted that, in the example of FIG. 1, four IFs 4*d*-2 are provided in the CM 4.

The IF 4*d*-3 is an example of a communication interface that performs control and so forth of coupling and communication with the DE 5 (storage device 51). For example, the IF 4*d*-3 may include a plurality of (in the example of FIG. 3, two) IOCs 4*g* and an Expander (EXP) 4*h*.

The IOC 4*g* is an example of an I/O controller that controls access (I/O) to the DE 5. Further, the EXP 4*h* is an example of a module that performs expansion of the number of devices capable of being coupled (SAS coupled) under the CM 4. The EXP 4*h* may be coupled with the DE 5 through a cable or the like compatible with SAS. It is to be noted that a wiring line (cable) from the EXP 4*h* may be coupled with the IOM, for example, through an adapter in the DE 5.

It is to be noted that, in the example of FIG. 3, a plurality of IOCs 4*g* are coupled with the EXP 4*h* of the belonging CM 4 and the EXP 4*h* of the different CM 4 in the CE 3, and the EXPs 4*h* are coupled with the DE 5 corresponding to the CE 3.

For example, an access request inputted from the host apparatus 6 to the DE 5 (storage device 51) through the IF 4*d*-2 is issued, after packet generation is performed by the CPU 4*a* and IOC 4*g*, to the DE 5 through the EXP 4*h*. Further, a response from the DE 5 is received by the CPU 4*a* through the EXP 4*h* and the IOC 4*g* and is returned to the host apparatus 6 through the IF 4*d*-2.

Returning to the description of FIG. 2, the interface unit 4*d* may include a reading unit that reads out data or a program recorded on a recording medium 4*f*. The reading unit may include a coupling terminal or an apparatus with or into which an non-transitory computer-readable recording medium 4*f* may be coupled or inserted. As the reading unit, for example, an adapter in compliance with Universal Serial Bus (USB) or the like, a drive apparatus that performs access to a recording disk, or a card reader that performs access to a flash memory such as an SD card or the like is available. It is to be noted that the control program 10 may be stored in the recording medium 4*f*.

The input and output unit 4*e* may include at least part of inputting units such as a mouse, a keyboard or an operation button and outputting units such as a display unit. For example, the inputting unit may be used for working such as various kinds of operation such as registration or changing of setting and mode selection (changeover) of a system and inputting of data by a user or an operator, and the outputting unit may be used for outputting such as confirmation of setting and various notifications by an operator or the like.

The hardware configuration of the CM 4 described above is exemplary. Accordingly, addition and omission (deletion) of hardware (for example, addition or deletion of an arbitrary block), disintegration (division) of hardware, integration by an arbitrary combination of hardware, addition or omission (deletion) of a bus and so forth in the CM 4 may be suitably performed.

[1-3] Example of Functional Configuration of CM

Figure 4:
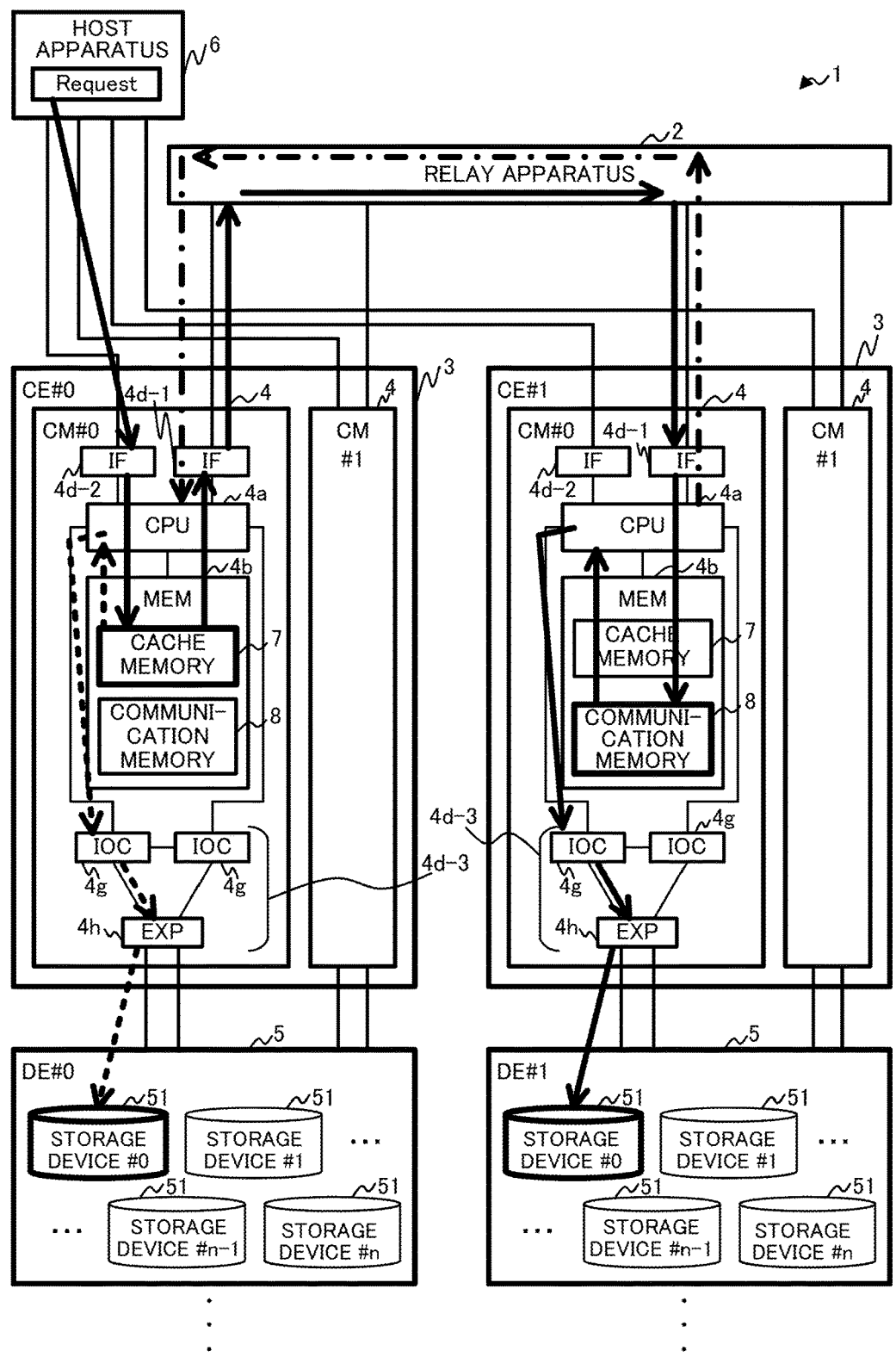
FIG. 4 is a view illustrating an example of an access process of the CM.
Figure 5:
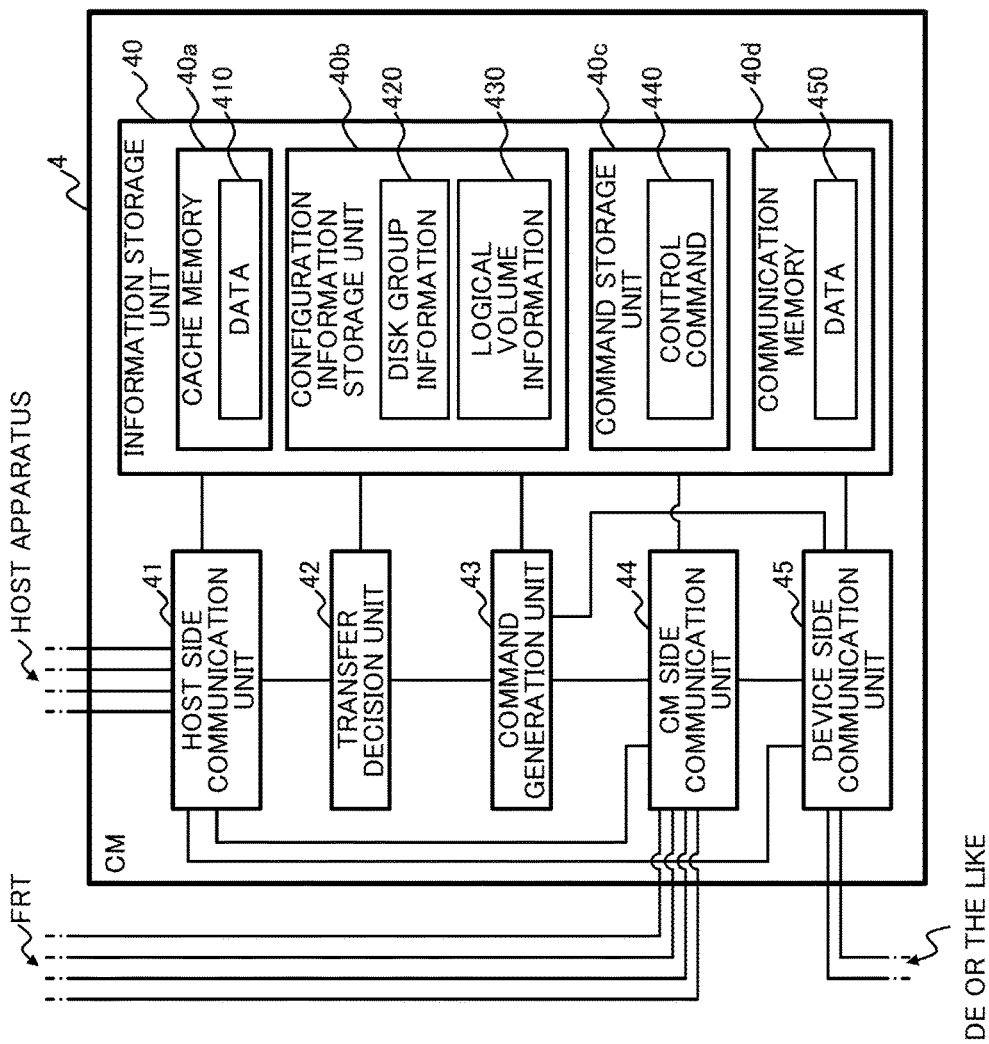
FIG. 5 is a view depicting an example of a functional configuration relating to the access process of the CM.

Now, an example of a functional configuration of the CM 4 according to the embodiment is described with reference to FIGS. 4 and 5. FIG. 4 is a view illustrating an example of an access process of the CM 4 depicted in FIG. 1, and FIG. 5 is a view depicting an example of a functional configuration relating to the access process of the CM 4. It is to be noted that, in the example of FIG. 4, the number of devices in the storage apparatus 1 depicted in FIG. 1, the number of cables and the like are simplified. Further, in the example of FIG. 4, a state is depicted in which a single host apparatus 6 is coupled with a plurality of CMs 4.

In the following description, where the CEs 3, CMs 4 and DEs 5 and storage devices 51 depicted in FIG. 4 are specified, reference characters #0 and #1 are sometimes used in place of reference numerals and, for example, the CEs 3 are represented as CE #0 and CE #1.

As exemplified in FIG. 4, in the storage apparatus 1 according to the embodiment, a specific CM 4 and a specific device, for example, a DE 5 (storage device 51, IOM (not depicted) or the like), are connected directly to each other. For example, the CM #0 and the CM #1 of the CE #0 and the DE #0 are connected directly to each other, but the CM #0 and the CM #1 of the CE #0 and the DE #1 are not connected directly to each other.

It is assumed that, in such a storage apparatus 1 as described above, for example, the CM #0 of the CE #0 performs access to a device that configures a disk group in charge but is not directly connected to the own CM 4, for example, to the storage device #0 of the DE #1.

In this case, the CM #0 of the CE #0 may perform communication with the CM #0 of the CE #1 directly connected to the storage device #0 of the DE #1, and the CM #0 of the CE #1 may access to the storage device #0 of the DE #1 on the basis of an access request. As an example, as indicated by an arrow mark of a thick line (solid line) in FIG. 4, each of the CMs 4 may perform a process described below.

If the CM #0 of the CE #0 receives an access request (Request, I/O) to the storage device #0 of the DE #1 from the host apparatus 6 by the IF 4*d*-2, then, if the request is a write I/O, then write data is stored into the cache memory 7 by the CPU 4*a*. Then, the CPU 4*a* recognizes positional information of a device of an access destination relating to the access request using configuration information hereinafter described of the storage apparatus 1 and decides whether or not communication with any other CM 4 is being performed.

If the CM #0 of the CE #0 is not directly connected to the device of the access destination, then the CM #0 specifies a different CM 4 (in this case, the CM #0 of the CE #1) directly connected to the device of the access destination. Then, the CM #0 of the CE #0 (hereinafter referred to sometimes as communication source CM 4) performs communication with the specified CM #0 of the CE #1 (hereinafter referred to sometimes as communication destination CM 4) by the IF 4*d*-1. At this time, information based on the access request is transferred through the relay apparatus 2 between the communication source CM 4 and the communication destination CM 4.

The communication destination CM 4 stores the information received from the communication source CM 4 into a communication memory 8 by the CPU 4*a*. Then, the communication destination CM 4 performs, using the information stored in the communication memory 8, access based on the access request from the CPU 4*a* to the storage device #0 of the DE #1 that is a device of the access destination through the IF 4*d*-3 (IOC 4*g* and EXP 4*h*).

If the access to the storage device #0 by the communication destination CM 4 is completed, then, as indicated by an arrow mark of a thick line (alternate long and short dash line) in FIG. 4, the communication destination CM 4 issues a notification of completion of access to the CPU 4a of the communication source CM 4 through the IF 4d-1 and the relay apparatus 2 by the CPU 4a, and the access process is completed therewith.

It is to be noted that, if the device of the access destination is a device directly connected to the CM #0 of the CE #0, for example, the storage device #0 of the DE #0, then access can be performed to the device of the access destination by a known method.

For example, as indicated by an arrow mark of a thick line (broken line) in FIG. 4, the CPU 4a of the CM #0 of the CE #0 performs, using the information stored in the cache memory 7, access based on the access request from the CPU 4a to the storage device #0 of the DE #0 that is a device of the access destination through the IF 4d-3.

It is to be noted that, if the access request is a read request, then data read out from the device of the access destination is transferred in a direction opposite to the direction of the arrow mark of the thick line (solid line) in FIG. 4, namely, from the communication memory 8 of the communication destination CM 4 to the cache memory 7 of the communication source CM 4, and is transmitted to the host apparatus 6.

Figure 15:
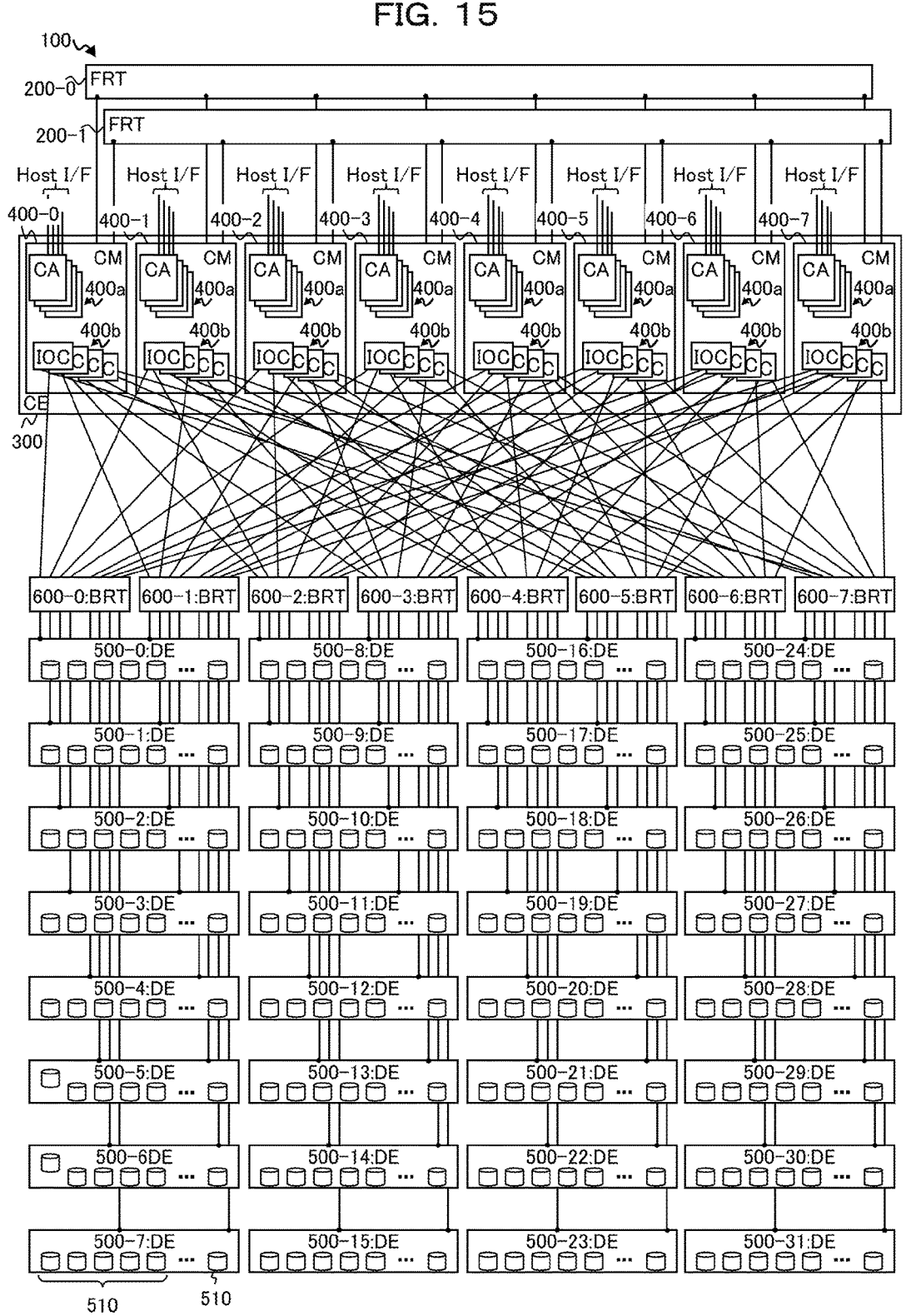
FIG. 15 is a view depicting an example of a configuration of a storage apparatus.

As described above, in the storage apparatus 1 according to the embodiment, similarly to the storage apparatus 100 exemplified in FIG. 15, access can be performed from any CM 4 to all of the (arbitrary) devices.

As depicted in FIG. 5, in order to implement the access process described above, the CM 4 exemplarily includes an information storage unit 40, a host side communication unit 41, a transfer decision unit 42, a command generation unit 43, a CM side communication unit 44 and a device side communication unit 45. Functions of the components just described may be realized by executing the control program 10 by the CPU 4a.

The information storage unit 40 may store various kinds of information relating to the access process of the CM 4 therein. The information storage unit 40 may be implemented, for example, by using at least part of the storage region of the memory 4b depicted in FIGS. 1 to 3.

As depicted in FIG. 5, the information storage unit 40 may exemplarily secure a storage region to be used as a cache memory 40a, a configuration information storage unit 40b, a command storage unit 40c and a communication memory 40d. Description of the cache memory 40a, configuration information storage unit 40b, command storage unit 40c and communication memory 40d is given in the description of functional blocks of the CM 4.

The host side communication unit 41 may perform communication of information such as various commands and various kinds of data with the host apparatus 6. The host side communication unit 4l may be implemented, for example, by at least part of functions of the CPU 4a and the IF 4d-2 depicted in FIG. 3.

For example, the host side communication unit 41 may perform a reception process for receiving an access request from the host apparatus 6 and a transmission process for performing a response to the access request to the host apparatus 6. It is to be noted that a kind of access such as a write I/O or a read I/O and a logical volume and an address of an access destination may be included in the access request from the host apparatus 6. Further, where the access request is a write I/O, write data may be included additionally in the access request.

The host side communication unit 41 may use the cache memory 40a in the communication with the host apparatus 6. The cache memory 40a may store therein, for example, information transferred between the host side communication unit 41 and the host apparatus 6.

As an example, if an access request is received from the host side communication unit 41 in the reception process, then the host side communication unit 41 may issue a notification of the access request to the transfer decision unit 42. At this time, if the access request to the DE 5 received from the host apparatus 6 is a write I/O, then the host side communication unit 41 may store data (write data) 410 into the cache memory 40a.

It is to be noted that, when the CM 4 performs writing into the storage device 51, for example, by Write Back, if a access request is received, then the host side communication unit 41 may return a response to the host apparatus 6 after write data is stored into the cache memory 40a.

Further, in the transmission process, if the access request is a read I/O, then the host side communication unit 41 may transmit data (read data) 410 stored in the cache memory 40a by a process hereinafter described to the host apparatus 6 together with a response corresponding to the access request.

Further, if a notification that the process for the access destination is completed is issued from the CM side communication unit 44 or the device side communication unit 45, then the host side communication unit 41 may place the data 410 stored in the cache memory 40a into a releasable state. The releasable state is a state in which the stored information is capable of being deleted (overwritten) in the cache memory 40a. The information placed in the releasable state may possibly be selected as a deletion target, for example, in cache control such as Least Recently Used (LRU) or round robin in operation of the cache memory 40a.

The transfer decision unit 42 may perform a decision process for deciding whether or not the information based on the access request conveyed from the host side communication unit 41 is to be transferred to a different CM 4. If it is decided that the information is to be transferred, then the decision process may include a process for specifying a CM 4 of a transfer destination (communication destination CM 4). In the decision process, the transfer decision unit 42 may use the information stored in the configuration information storage unit 40b.

The configuration information storage unit 40b may exemplarily retain (store) disk group information 420 and logical volume information 430.

The disk group information 420 is an example of information for managing groups of the plural storage devices 51 set in the storage apparatus 1. For example, information for managing a RAID group may be set in the disk group information 420. In the following description, it is assumed that a disk group is a RAID group.

An example of the disk group information 420 is depicted in FIG. 6. In the disk group information 420, a RAID group number, a RAID level, the number of configuration disks of the RAID group, a configuration disk, the number of Logical Unit Numbers (LUNs) and a LUN number may be included exemplarily. It is to be noted that the disk group information 420 may be set for each RAID group.

As an example, in the items of the disk group information 420 depicted in FIG. 6, "RAID group #00", "RAID 1", "2", "DE #00 Slot #00 and DE #10 Slot #01", "2" and "LUN #00 and LUN #01" are set.

The RAID group number is information for identifying the RAID group, and the RAID level indicates from which RAID level the RAID group is constructed. The number of configuration disks indicates the number of disks configuring the RAID group, for example, the number of the storage devices 51, and the configuration disk is information indicating an installation place (address) of disks configuring the RAID group. For example, the configuration disk may be represented by a DE number of a DE 5 that stores a storage device 51 and a slot number of a slot (slot position) in which the storage device 51 is incorporated. The number of LUNs indicates the number of LUNs set to the RAID group, and the LUN number is information for identifying the LUNs. It is to be noted that the LUN is an example of a logical volume and is a volume unit for management obtained by dividing the RAID group.

The logical volume information 430 is an example of information for managing the logical volume set to the disk group. For example, information for managing the LUN may be set to the logical volume information 430. In the following description, it is assumed that the logical volume is a LUN.

An example of the logical volume information 430 is depicted in FIG. 7. In the logical volume information 430, a LUN number, a RAID group number and a host I/F may be included exemplarily. It is to be noted that the logical volume information 430 may be set for each LUN.

As an example, in the items of the logical volume information 430 depicted in FIG. 7, "LUN #00", "RAID group #00", and "CE #00 CM #00 CA #00 and CE #01 CM #00 CA #00" are set.

The LUN number is information for identifying the LUN and corresponds to the LUN number set to the disk group information 420. The RAID group number indicates a RAID group number (refer to FIG. 6) of a RAID group corresponding to the LUN. The host I/F is information indicating an interface of a destination of an access request for accessing the LUN. The host I/F may be, for example, a channel adapter (CA) that is an example of the interface unit 4d-2 of the CM 4.

Further, the CM 4 may provide the logical volume information 430 or like information to the host apparatus 6. Consequently, relating to a logical volume of a disk group for which access is desired to be performed, the host apparatus 6 may specify an interface (CE 3, CM 4 and interface unit 4d (for example, CA)) that is a destination to which an access request is to be issued. As an example, the host apparatus 6 may issue, based on the logical volume information 430, a request for access (I/O) for performing access to the LUN #00 to the CA #00 of the CM #00 (CM 4 in charge of the logical volume) of the CE #00.

It is to be noted that, while the disk group information 420 and the logical volume information 430 described above are represented in the form of a table in the example of FIGS. 6 and 7, the disk group information 420 and the logical volume information 430 may be handled actually in the form of an array or the like by the CPU 4a.

The CM 4 may manage the coupling relationship among the plurality of CMs 4 and the plurality of DEs 5 based on the disk group information 420 and the logical volume information 430. It is to be noted that, when generation, change, deletion or the like of a disk group or a logical volume is performed in the storage apparatus 1, generation or updating of the disk group information 420 and the logical volume information 430 may be performed, for example, by the CM 4 or the like.

Referring back to the description of FIG. 5, the transfer decision unit 42 may perform a decision process based on an access request conveyed thereto from the host side communication unit 41 and also on the disk group information 420 and logical volume information 430 stored in the configuration information storage unit 40b.

For example, in the decision process, the transfer decision unit 42 may acquire information of the LUN included in an access request, for example, a RAID group number corresponding to the LUN number, by referring to the logical volume information 430. Then, the transfer decision unit 42 may acquire information of configuration disks from the disk group information 420 corresponding to the acquired RAID group number and may acquire information of a storage device 51 of the access destination relating to the access request.

By such a process as just described, the transfer decision unit 42 may decide whether or not the storage device 51 is coupled with the own CM 4 by referring to the configuration information or the like relating to the storage device 51 of the access destination. For example, if it is decided that the storage device 51 of the access destination is coupled with the own CM 4, then the transfer decision unit 42 may decide that communication with (transfer to) a different CM 4 is not to be performed. Further, if it is decided that the storage device 51 is not coupled with the own CM 4, the transfer decision unit 42 may decide that communication with (transfer to) a different CM 4 coupled with the storage device 51 is to be performed.

As an example, if the host apparatus 6 issues an access request to the LUN #00 to the CM #00 of the CE #00, then the transfer decision unit 42 of the CM #00 of the CE #00 refers to the logical volume information 430 to extract the RAID group #00 from the LUN #00. Then, the transfer decision unit 42 refers to the disk group information 420 corresponding to the RAID group #00 to acquire "DE #00 Slot #00 and DE #10 Slot #10". At this time, if the access destination is the storage device 51 of "DE #00 Slot #00", then, for example, the transfer decision unit 42 decides that the access destination is connected to the own CM 4 and decides that communication with a different CM 4 is unnecessary. On the other hand, if the access destination is the storage device 51 of "DE #10 Slot #10", then, for example, the transfer decision unit 42 decides that the access destination is not connected to the own CM 4 and decides that communication with a different CM 4 is to be performed.

Further, if the decision process is completed, then the transfer decision unit 42 may issue a notification of the information of the storage device 51 of the access destination acquired in the decision process to the command generation unit 43. In the notification, at least part of the information of the access request used in the decision process may be included. It is to be noted that, if it is decided in the decision process that the storage device 51 is connected to a different CM 4, then the information of the different CM 4 (communication destination CM 4) may be included in the notification.

In this manner, with the transfer decision unit 42, even if the CEs 3 (CMs 4) coupled with each DE 5 are limited (DE 5 is not coupled with all of the CMs 4) as depicted in FIG. 1, each of the CMs 4 may decide which CMs 4 are coupled with each DE 5.

From the foregoing, the disk group information 420 and the logical volume information 430 stored in the configuration information storage unit 40b are an example of coupling information relating to a coupling relationship among the plurality of CMs 4 and the plurality of DEs 5.

Further, the transfer decision unit 42 is an example of a specification unit that specifies a second CM 4 in charge of the first DE 5 based on the coupling information stored in the information storage unit 40 in accordance with a first access request to the first DE 5 from among the plurality of DEs 5. It is to be noted that "in charge" may include that, in the embodiment, the second CM 4 is physically connected to the first DE 5 through a cable or the like directly, or indirectly through a different one of the DEs 5 coupled in cascade connection.

The command generation unit 43 is an example of a generation unit that generates a control command 440 to be issued from a CM 4 to a DE 5 and stores the generated command into the information storage unit 40. For example, the command generation unit 43 may store the generated control command 440 into the command storage unit 40*c*.

The control command 440 is an example of information based on an access request, together with the data 410 in the case of a write I/O. The control command 440 may be a command used for performing a write instruction or a read instruction from a CM 4 to a storage device 51. As the control command 440, a command in compliance with the specification used in the storage device 51, for example, a SCSI command, is available.

In the control command 440, at least one of various control contents such as a write I/O or a read I/O, and an address of an access destination may be included. It is to be noted that, in the case of the write request, information of write data (data 410), for example, information of a storage address or the like of the data 410 in the cache memory 40*a*, may be linked to (associated with) the control command 440.

The command generation unit 43 may generate the control command 440, for example, when an access request from the host apparatus 6 to the DE 5 (storage device 51) is received.

As an example, the command generation unit 43 may generate the control command 440 for the storage device 51 of the access destination based on the information conveyed thereto from the transfer decision unit 42 when the decision process is completed in the transfer decision unit 42. At this time, the command generation unit 43 may generate the control command 440 irrespective of a result of the decision regarding whether or not the storage device 51 of the access destination is connected to the own CM (irrespective of whether or not communication with a different CM 4 is performed).

In other words, the command generation unit 43 may generate not only the control command 440 to be transmitted to the DE 5 coupled with the own CM 4 but also a control command to be transmitted to the DE 5 coupled with a different CM 4 by the different CM 4 and corresponding to an access request.

After the control command 440 is generated and is stored into the command storage unit 40*c*, the command generation unit 43 may issue a notification of information of the control command 440 (for example, storage address in the command storage unit 40*c*) to the CM side communication unit 44 or the device side communication unit 45. For example, the command generation unit 43 may issue, when the information of the control command 440 is addressed to the storage device 51 coupled with the own CM 4, a notification of the information of the control command 440 to the device side communication unit 45, or may issue, when the information is addressed to the storage device 51 coupled with a different CM 4, a notification to the CM side communication unit 44.

It is to be noted that, while it has been described that the control command 440 is stored into the command storage unit 40*c*, the embodiment is not limited to this and, for example, the control command 440 may be stored in the cache memory 40*a*. In other words, the cache memory 40*a* and the command storage unit 40*c* are examples of the cache memory 7 depicted in FIG. 4.

The CM side communication unit 44 may perform communication of information through the relay apparatus 2 with a CM 4 provided in a different CE 3 in the storage apparatus 1. The CM side communication unit 44 may be implemented, for example, by at least part of the functions of the CPU 4*a* and the IF 4*d*-1.

For example, similarly to the storage apparatus 100 exemplified in FIG. 15, the CM side communication unit may achieve synchronization of configuration information of apparatus or the like between the CMs 4 and may perform a request for a process to a different CM 4 or the like by inter-CM information communication through the FRT 21. It is to be noted that the inter-CM information communication may be implemented, for example, by a communication function for which a technology of Direct Memory Access (DMA) transfer is used.

Further, in the storage apparatus 1 according to the embodiment, the CM side communication unit 44 may perform transfer (communication) of information based on an access request between CMs 4. For example, the CM side communication unit 44 may implement transfer of user data between CMs 4 by performing communication for which DMA is used and which is similar to the inter-CM information communication in the transfer of the information.

Here, the CM side communication unit 44 may include at least one of, preferably, both of, functions at the side from which information based on the access request is transmitted (communication source) and the side by which the information is received (communication destination).

An example of a process of the CM side communication unit 44 in each of the communication source CM 4 and the communication destination CM 4 is described below with reference to FIG. 8. It is to be noted that, in FIG. 8, for simplification of illustration, illustration of part of components, for example, components other than the memory 4*b* in the host apparatus 6, CM #1 and CM #0, redundant wiring lines between the devices and so forth are omitted in comparison with FIG. 4.

CM Side Communication Unit 44 of Communication Source CM 4

The CM side communication unit 44 of the communication source CM 4 may perform a communication source process for transferring the control command 440 and the write I/O (in the case where the access request is a write I/O) stored in the command storage unit 40*c*, to the communication destination CM 4, in response to a notification issued from the command generation unit 43.

The communication source process may include transfer control for transferring the control command 440 and in the case of the write I/O, the data 410, to the communication destination CM 4 through the relay apparatus and reception control for receiving a completion notification of access based on the control command 440 from the communication destination CM 4.

As described above, the CM side communication unit 44 may transfer information based on the access request to the communication destination CM 4 using DMA as in the inter-CM information communication. Accordingly, in the communication with the communication destination CM 4 by the CM side communication unit 44, access using the DMA by the CM 4 of the communication opponent to the information storage unit 40 of the communication source CM 4 or the communication destination CM 4 may be permitted.

For example, the CM side communication unit 44 as a transfer source of data may write data directly into a memory of a transfer destination of the data (can perform DMA transfer). It is to be noted that the CM side communication unit 44 as a transfer destination of data may write the data transferred (DMA transferred) thereto from a memory of a transfer source of the data into a memory in the own CM 4. While the embodiment is described below taking the case in which the CM side communication unit 44 writes data into the memory 4d of the communication destination CM 4 by DMA transfer in the transfer control as depicted in FIG. 8 as an example, any function may be used.

As an example, in the transfer control, the CM side communication unit 44 may transmit a transmission notification of information through the relay apparatus 2 to the communication destination CM 4. The transmission notification may be a notification that the control command 440 stored in the command storage unit 40c and the data 410 (in the case of the write I/O) stored in the cache memory 40a are transferred through the relay apparatus 2, or another notification that instructs the communication destination CM 4 to acquire the information. Further, the transmission notification may include that it instructs the communication destination CM 4 to perform access to the storage device 51 of the access destination using the acquired control command 440.

It is to be noted that the transmission notification may include an address in which the control command 440 is stored in the command storage unit 40c and a storage address of the data 410 in the cache memory 40a linked to the control command 440 in the case where the access request is a write I/O.

Or, the CM side communication unit 44 may place the transmission notification into and transmit the transmission notification including the control command 440 to the communication destination CM 4. In this case, an instruction for acquiring the control command 440 stored in the command storage unit 40c does not need to be included in the transmission notification.

In this manner, the CM side communication unit 44 is an example of a communication unit that issues an instruction for accessing the DE 5 based on a first access request to the communication destination CM 4 specified by the transfer decision unit 42 through the relay apparatus 2.

Further, since the CM side communication unit 44 can issue an instruction for accessing the storage device using the control command 440 generated by the communication source CM 4 to the communication destination CM 4 through the relay apparatus 2, access to the storage device 51 that is not connected to the CM 4 can be implemented indirectly.

Further, the CM side communication unit 44 can transfer (DMA transfer) and write the information stored in the communication source CM 4 directly to and into the communication memory 40d hereinafter described, which is provided in the communication destination CM 4. Consequently, after transmission of the transmission notification (and information), the communication source CM 4 can allocate a resource to some other process before a completion notification is received from the communication destination CM 4. Further, since the communication destination CM 4 acquires information by DMA transfer, the CPU 4a and so forth of the communication destination CM 4 can reduce the waiting time period for waiting completion of transfer and can perform access to the storage device 51 efficiently.

If the transmission notification described above is transmitted to the communication destination CM 4 in the transmission control, then the CM side communication unit 44 may transit to reception control for waiting reception of a completion notification of the access based on the control command 440 from the communication destination CM 4.

When the access request is a write I/O, if the completion notification of access to the storage device 51 based on the control command 440 is received from the communication destination CM 4 in the reception control, then the CM side communication unit 44 may issue a notification to the host side communication unit 41 and may place the data 410 stored in the cache memory 40a into a releasable state.

When the access request is a read I/O, the CM side communication unit 44 may receive response data (read data) from the communication destination CM 4 in the reception control. Also transfer of the read data from the communication destination CM 4 to the communication source CM 4 may be performed using DMA similarly as in the inter-CM information communication described above.

In transfer of the read data, the CM side communication unit 44 may write the read data directly into the cache memory 40a of the communication source CM 4 by transferring (DMA transferring) the data 450 in the communication memory 40d of the communication destination CM 4. Further, the read data may be directly transferred (DMA transferred) to and written into the cache memory 40a of the communication source CM 4 by the communication destination CM 4. It is to be noted that the transferred read data may be stored as the data 410 into the cache memory 40a.

For example, if the storage address of read data (data 450) in the information storage unit 40 (communication memory 40d) of the communication destination CM 4 is conveyed from the communication destination CM 4, then the CM side communication unit 44 of the communication source CM 4 may write the read data DMA-transferred from the storage address into the cache memory 40a.

Or, the communication destination CM 4 may write the read data by DMA transfer into an address ((scheduled) storage address of the read data) of the cache memory 40a of the communication source CM 4. The address of the DMA destination may be issued in advance as an instruction to the communication destination CM 4, for example, by the communication source CM 4 using the transmission notification.

If the read data is transferred and the completion notification is received, then the CM side communication unit 44 may perform an instruction for transmitting (sending as a response) the data 410 of the cache memory 40a as response data to the host apparatus 6 to the host side communication unit 41.

It is to be noted that, when the CM 4 performs writing into the storage device 51, for example, by Write Through, if a completion notification is received from the communication destination CM 4, then the CM side communication unit 44 may instruct the host side communication unit 41 to send a response to the access request to the host apparatus 6.

In this manner, in the communication source CM 4, even if information based on the access request is transferred to the communication destination CM 4, response to the host apparatus 6 can be performed by the own CM 4. Consequently, the storage apparatus 1 can provide an interface similar to that of, for example, the storage apparatus 100 depicted in FIG. 15 to the host apparatus 6.

CM Side Communication Unit 44 of Communication Destination CM 4

The CM side communication unit 44 of the communication destination CM 4 may perform a communication destination process for acquiring the control command 440 and so forth from the communication source CM 4 in accordance with the transmission notification received from the communication source CM 4 and accessing the storage device 51 of an access destination based on the acquired control command 440.

The communication destination process may include acquisition control for acquiring the control command 440 and the data 410 (in the case of a write I/O) from the communication source CM 4 in accordance with the transmission notification received from the communication source CM 4. Further, the communication destination process may include access control for accessing the storage device 51 of an access destination using the acquired control command 440 and transmitting a completion notification (response) to the communication source CM 4 based on a result of the access.

In the acquisition control, the CM side communication unit 44 may perform access, in which DMA is used, to an address of the command storage unit 40c included in the transmission notification through the relay apparatus 2 in accordance with the transmission notification received from the communication source CM 4. Consequently, the CM side communication unit 44 may acquire the control command 440 from the communication source CM 4 (refer to an arrow mark of "transmission notification or DMA" in FIG. 8).

Further, when the access request is a write I/O, in the acquisition control, the CM side communication unit 44 may receive the data 410 DMA-transferred thereto from the communication source CM 4 such that the data 410 is written into the communication memory 40d of the communication destination CM 4 by the communication source CM 4. Further, in the acquisition control, the CM side communication unit 44 may write the data 410 DMA-transferred thereto through the relay apparatus 2 from the address of the cache memory 40a linked to the control command 440 into the communication memory 40d. Consequently, the CM side communication unit 44 can acquire the data 410 from the communication source CM 4 (refer to an arrow mark of "DMA (in the case of Write I/O)" in FIG. 8). Since, in any case, in the CM side communication unit 44, write control of the data 410 into the communication memory 40d can be performed by the interface unit 4d such as, for example, the IF 4d-1, intervention of the CPU 4a relating to data transfer can be avoided.

It is to be noted that, if the control command 440 is included in the transmission notification received from the communication source CM 4, then the CM side communication unit 44 does not need to acquire the control command 440 stored in the command storage unit 40c.

The CM side communication unit 44 may store the acquired control command 440 into the command storage unit 40c of the communication destination CM 4 in the acquisition control. The communication memory 40d is an example of the communication memory 8, for example, depicted in FIG. 4, and is an example of a buffer memory that stores information transferred between the CM side communication units 44 of the communication source CM 4 and the communication destination CM 4 therein.

It is to be noted that, since the control command 440 is a command generated in an environment of the communication source CM 4, in the case of a write request, the address of the data 410 in the cache memory 40a linked to (associated with) the control command 440 is sometimes different from the address of the data 450 in the communication memory 40d in the communication destination CM 4. Therefore, it is preferable for the CM side communication unit 44 to update at least part of the information relating to the control command 440, for example, the address of the linked data 450.

Figure 8:
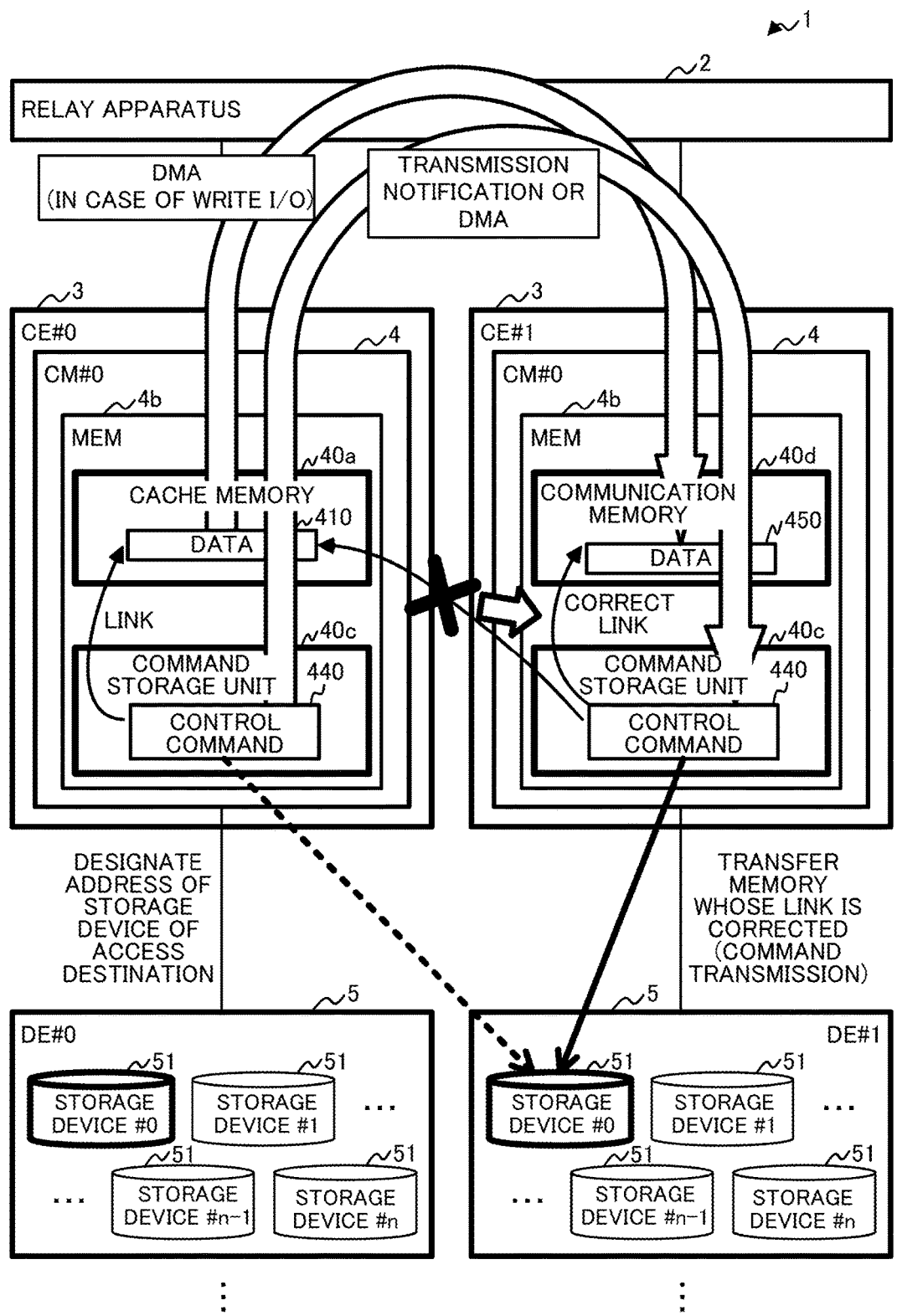
FIG. 8 is a view illustrating an example of a process of a CM side communication unit in each of a communication source CM and a communication destination CM.

For example, as depicted in FIG. 8, the control command 440 generated in the communication source CM 4 is a command that designates (is linked to) the data 410 in the cache memory 40a of the CM #0. Even if the control command 440 is transferred to the CM #1 that is the communication destination CM 4, the link remains designating the data 410 in the cache memory 40a of the CM #0. Therefore, the CM side communication unit 44 of the CM #1 may correct the link for the control command 440 so as to designate the data 450 in the communication memory 40d of the CM #1 and may transfer the memory (command storage unit 40c) in which the link has been corrected, for example, may transmit the control command 440.

It is to be noted that, as depicted in FIG. 8, in the control command 440 generated by the CM #0, the address of the storage device #0 of the DE #1 is designated as an address destination. In the CM #0, since the CM #0 and the DE #1 are not connected to each other, access from the CE#0 to the DE#1 based on the control command 440 is actually unavailable. However, by transferring the control command 440 to the CM #1, access to the address of the storage device #0 of the DE #1 is enabled actually in the CM #1.

If the control command 440 (and the data 450) is acquired and stored into the command storage unit 40c (and the communication memory 40d) in the acquisition control, then the CM side communication unit 44 may transit to the access control.

In the access control, the CM side communication unit 44 may issue a notification of information of the control command 440 and so forth stored in the command storage unit 40c, for example, the storage address of the command storage unit 40c to instruct the command storage unit 40c to access the storage device 51.

Further, if the access to the storage device 51 by the device side communication unit 45 is completed in the access control, then the CM side communication unit 44 may issue a notification of a result of the access to the communication source CM 4 together with a completion notification through the relay apparatus 2.

It is to be noted that, the result of the access may include information of a result of execution of the access by the device side communication unit 45 and so forth. Further, in the case of a read I/O, the data 450 (read data) stored in the communication memory 40d by the device side communication unit 45 may be included in the result of the access.

In the case of a read I/O, the CM side communication unit 44 may perform transfer of read data through the relay apparatus 2 with the communication source CM 4 using DMA transfer as described above.

Further, in the case of a read I/O, if transfer of the read data is completed, then the CM side communication unit 44 may release a region in which the read data (450) is stored in the communication memory 40d (for example, may manage the region in a releasable state) and may manage the region to a state in which a new request from the communication source CM 4 may be accepted.

The device side communication unit 45 may perform communication (access) of information based on the control command 440, for example, with the DE 5. The device side communication unit 45 may be implemented, for example, by at least part of functions of the CPU 4a and the IF 4d-3 depicted in FIG. 3.

For example, the device side communication unit 45 may perform access to the DE 5 coupled with the own CM 4 based on the control command 440 stored in the command storage unit 40c in accordance with a notification from the command generation unit 43 or the CM side communication unit 44.

As an example, if it is decided by the transfer decision unit 42 that communication is unnecessary and a notification is received from the command generation unit 43, then the device side communication unit 45 may transmit the control command 440 generated by the command generation unit 43 (and the data 410 in the cache memory 40a in the case of a write I/O) to the storage device 51 of the access destination. Further, if a response from the storage device 51 of the access destination is received (access is completed), then the device side communication unit 45 may issue a notification of the effect to the host side communication unit 41 and may store, in the case of a read I/O, the read data as the data 410 into the cache memory 40a.

Further, if the own CM 4 operates as the communication destination CM 4 and a notification is received from the CM side communication unit 44, then the device side communication unit 45 may transmit the control command 440 stored in the command storage unit 40c (and, in the case of a write request, the data 450 in the communication memory 40d) to the storage device 51 of the access destination. Further, if a response is received from the storage device 51 of the access destination (the access is completed), then the device side communication unit 45 may issue a notification of the effect to the CM side communication unit 44 and may store, in the case of a read request, the read data as the data 450 into the communication memory 40d.

As described above, in the storage apparatus 1 according to the embodiment, access can be performed from any CM 4 to all of the (arbitrary) devices.

It is to be noted that a plurality of, for example, all of the CMs in the storage apparatus 1 may include the configuration depicted in FIG. 5, respectively. Consequently, even if any CM 4 receives an access request from the host apparatus 6, a suitable CM 4 coupled with the DE 5 of the access destination can cope with the access request. In other words, any of the plural CMs 4 in the storage apparatus 1 can receive an access request from the host apparatus 6 and can function as the communication source CM 4 or the communication destination CM 4.

As described above, in the storage apparatus 1 according to the embodiment, communication of information based on an access request from the communication source CM 4 to the communication destination CM 4 may be performed through the relay apparatus 2. The relay apparatus 2 is added newly as an apparatus (module) in comparison with the storage apparatus 100 depicted in FIG. 15. Further, as a use of the relay apparatus 2, communication of data relating to the access process between the CMs 4 of the CEs 3 different from each other, for example, of the information based on the access request, the data 410 or the data 450 can be performed.

Consequently, in the storage apparatus 1, the BRT 600 and the wiring line between the BRT 600 and the CM 400 can be reduced, and the cost for introduction and addition of such apparatus or cable just described or the like can be reduced in comparison with the storage apparatus 100 depicted in FIG. 15.

Further, in a work for addition of a CE 3 (CM 4) or a DE 5, the CM 4 and the DE 5 may be coupled with each other and the CM 4 may be coupled with the relay apparatus 2. Thus, in comparison with the storage apparatus 100 depicted in FIG. 15, the complicated coupling work and so forth between the CM 400 and the BRT 600 can be reduced or simplified. Also expansion of a CM 4 and a DE 5 at the same timing can be facilitated. Accordingly, the storage apparatus 1 can be considered as a component suitable for operation (scale out) for expanding (adding) a CM 4 or a DE 5.

Furthermore, in the storage apparatus 1, the CM 4 and (only) part of the DEs 5 are coupled directly with each other by deleting the BRT 600 and the wiring line between the BRT 600 and the CM 400 in comparison with the storage apparatus 100 depicted in FIG. 15. Also in such a configuration as just described, the communication source CM 4 can indirectly access an apparatus of an access destination (for example, a DE 5) through the relay apparatus 2 and the communication destination CM 4 as described hereinabove. Accordingly, degradation of availability can be suppressed also in an environment in which coupling between the CM 4 and a device of a back end (for example, a DE 5) is limited.

In this manner, while the storage apparatus 1 according to the embodiment has an apparatus configuration that the path of the back end is minimized (simplified) in comparison with the storage apparatus 100 exemplified in FIG. 15, it can perform access directly to or indirectly through the relay apparatus 2 to all of (arbitrary) back end devices from any CM 4.

It is to be noted that, since, in the storage apparatus 100 exemplified in FIG. 15, access to the DE 500 is performed through a corresponding (redundant) BRT 600, if a multiple (double) failure of the BRT 600 occurs, then the access to a corresponding DE 500 may possibly become difficult.

In contrast, since the BRT 600 can be deleted in the storage apparatus 1, then influence of a failure of the BRT 600 can be ignored. On the other hand, in the storage apparatus 1, part of access paths is a path through the CM 4 in a different CE 3 as described above, the fault tolerance of the access path has an influence on the availability. However, since the fault tolerance of the access path can be enhanced in response to the degree of redundancy of the FRT 21 in the relay apparatus 2 or the CM 4 in the CE 3, the availability equal to that of the storage apparatus 100 can be implemented.

For example, depending upon the CE 3, three or more CMs 4 can be incorporated, and the availability can be easily enhanced rather than that in the case where three or more BRTs 600 and wiring lines per one DE 500 are provided in the storage apparatus 100 exemplified in FIG. 15. Further, since the relay apparatus 2 is provided as an apparatus (module) in the storage apparatus 1, upon occurrence of a failure of the FRT 21 or the like, recovery can be easily performed by performing exchange of the failed FRT 21 or the like, it can be considered that the maintainability is high.

As described above, with the storage apparatus 1 according to the embodiment, the scalability can be enhanced while degradation of the availability of the storage apparatus 1 is suppressed.

Further, the CM 4 according to the embodiment can include the cache memory 40a that is used when an access request is received from the host apparatus 6 and the communication memory 40d that is used when the own CM 4 functions as a communication destination CM 4. In this manner, the CM 4 can manage the communication memory 40d, which is used as a communication buffer, in a memory region different from that of the cache memory 40a.

Accordingly, such a situation can be avoided that the cache memory 40a is occupied in communication between the CMs 4 and therefore an access request from the host apparatus 6 is not received (I/O performance is degraded). Therefore, degradation of the I/O performance can be suppressed. It is to be noted that both of the cache memory 40a and the communication memory 40d can be secured in the storage region of the memory 4b. Accordingly, it is preferable to incorporate a memory 4b having a comparatively great capacity in the CM 4.

Further, in the storage apparatus 1 according to the embodiment, the CM 4 (in main charge) (communication source CM 4) that has received an I/O from the host apparatus 6 can generate a command (control command 440) for accessing a device irrespective of whether the device is coupled directly with the own CM 4 or is coupled with a different CM 4. Further, a different CM 4 (communication destination CM 4) can issue the command generated by the CM 4 in main charge to the device. Consequently, effects represented in (i) and (ii) given below can be achieved.

(i) Entities for performing decision of sequential access can be centralized.

When an I/O for sequential read is received from the host apparatus 6, the CM 4 can perform prefetch read by which a sequential property is detected and data is read ahead.

For example, it is assumed that the communication destination CM 4 generates the control command 440. In this case, depending upon an access range of the sequential read I/O, the prefetch read is decided by each of the communication source CM 4 and the communication destination CM 4. Therefore, it is difficult to perform efficient read.

In contrast, since, in the storage apparatus 1 according to the embodiment, the CM 4 that generates the control command 440 can manage decision of the prefetch read generally (centrally), efficient read can be implemented.

(ii) Management of disk performance information can be centralized.

The RAID apparatus frequently has a function capable of performing tuning of a performance of a RAID group. In such tuning as just described, it is preferable to aggregate (centrally manage) the performance of the RAID group to the CM 4 that performs disk access.

For example, in the case where communication between the CEs is performed using an I/F (path) to the outside of the storage apparatus, the CE of the communication source issues a requisite minimum command in accordance with the general standard, for example, with SCSI or the like, there is the possibility that it may be difficult to exchange a great amount of information like disk performance information between the CEs (CMs).

In contrast, in the storage apparatus according to the embodiment, communication among the plurality of CMs 3 (housings) is performed through the relay apparatus 2. Consequently, since communication in a free format can be performed between the CMs 4, the disk performance information can be aggregated in the CM 4 (in main charge) that generates the control command 440 and performance tuning of the RAID group can be performed easily.

[1-4] Example of Operation of Storage Apparatus

Now, an example of operation where an access request is issued from the host apparatus 6 in the storage apparatus 1 configured in such a manner as described above is described with reference to FIGS. 9 to 14. It is to be noted that, in the following description, a CM 4 that performs processes is represented as communication source CM 4 for the convenience of description also in the case where communication with a different CM 4 is not performed.

[1-4-1] Process for Write Request

Figure 9:
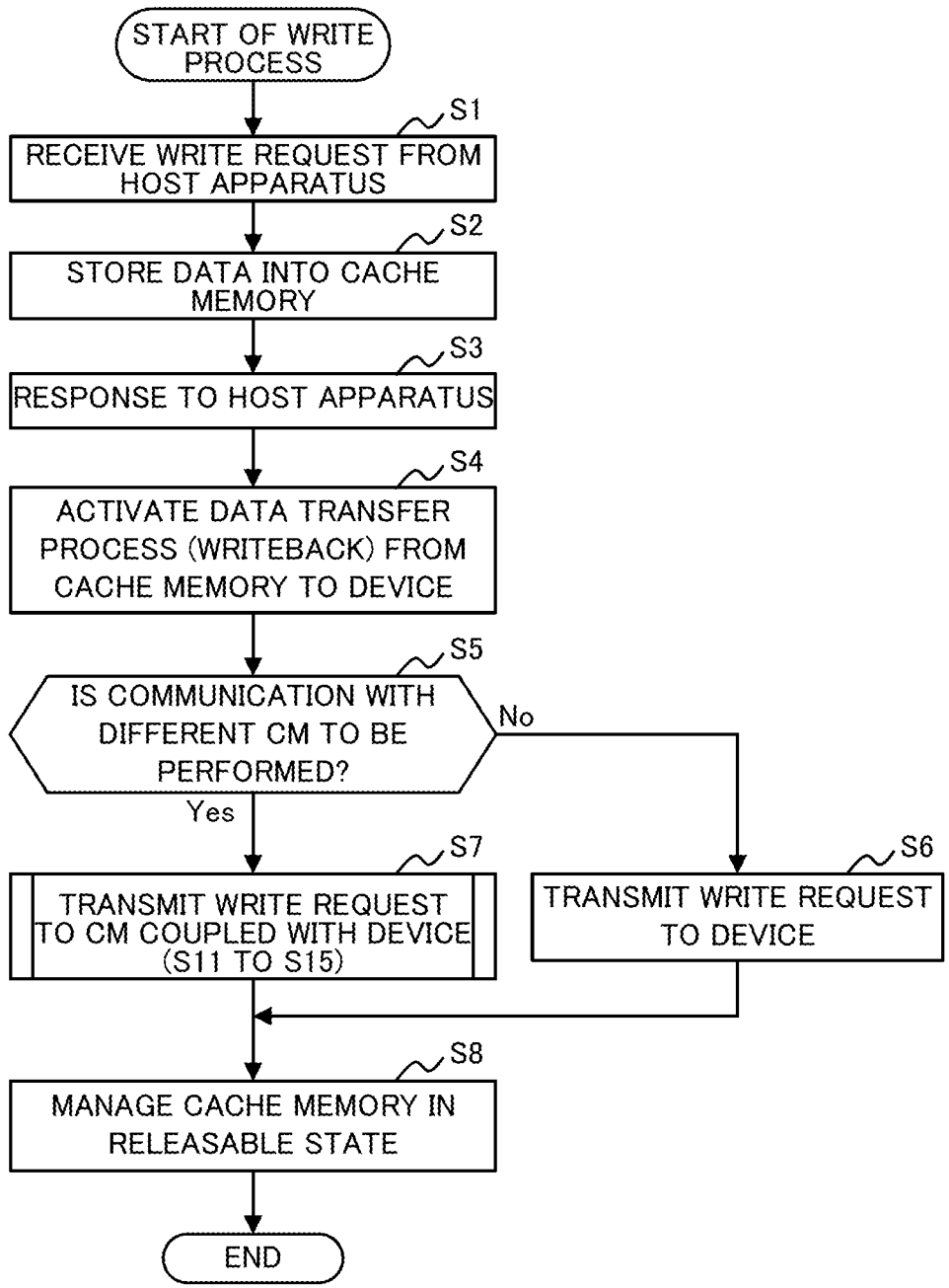
FIG. 9 is a flow chart illustrating an example of a process of the communication source CM when a write request is issued from a host apparatus.
Figure 10:
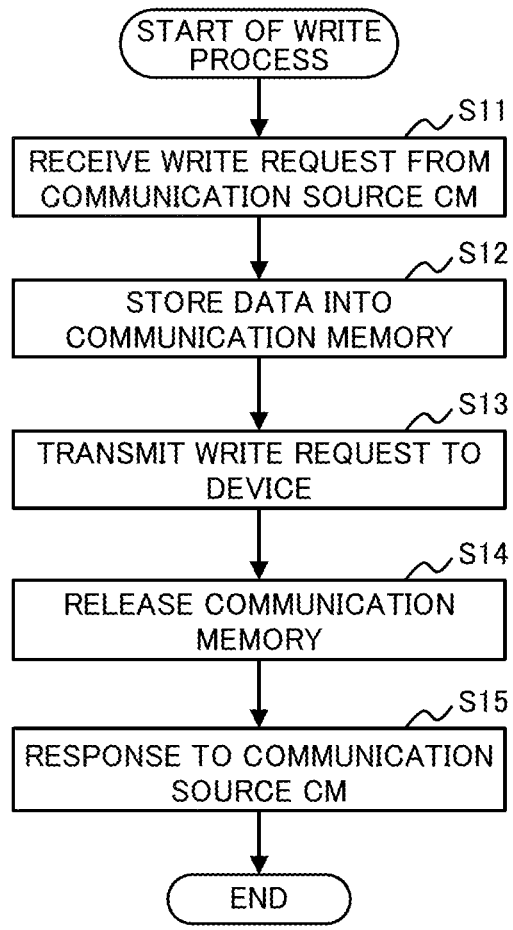
FIG. 10 is a flow chart illustrating an example of a process of the communication destination CM when a write request is issued from the host apparatus.
Figure 11:
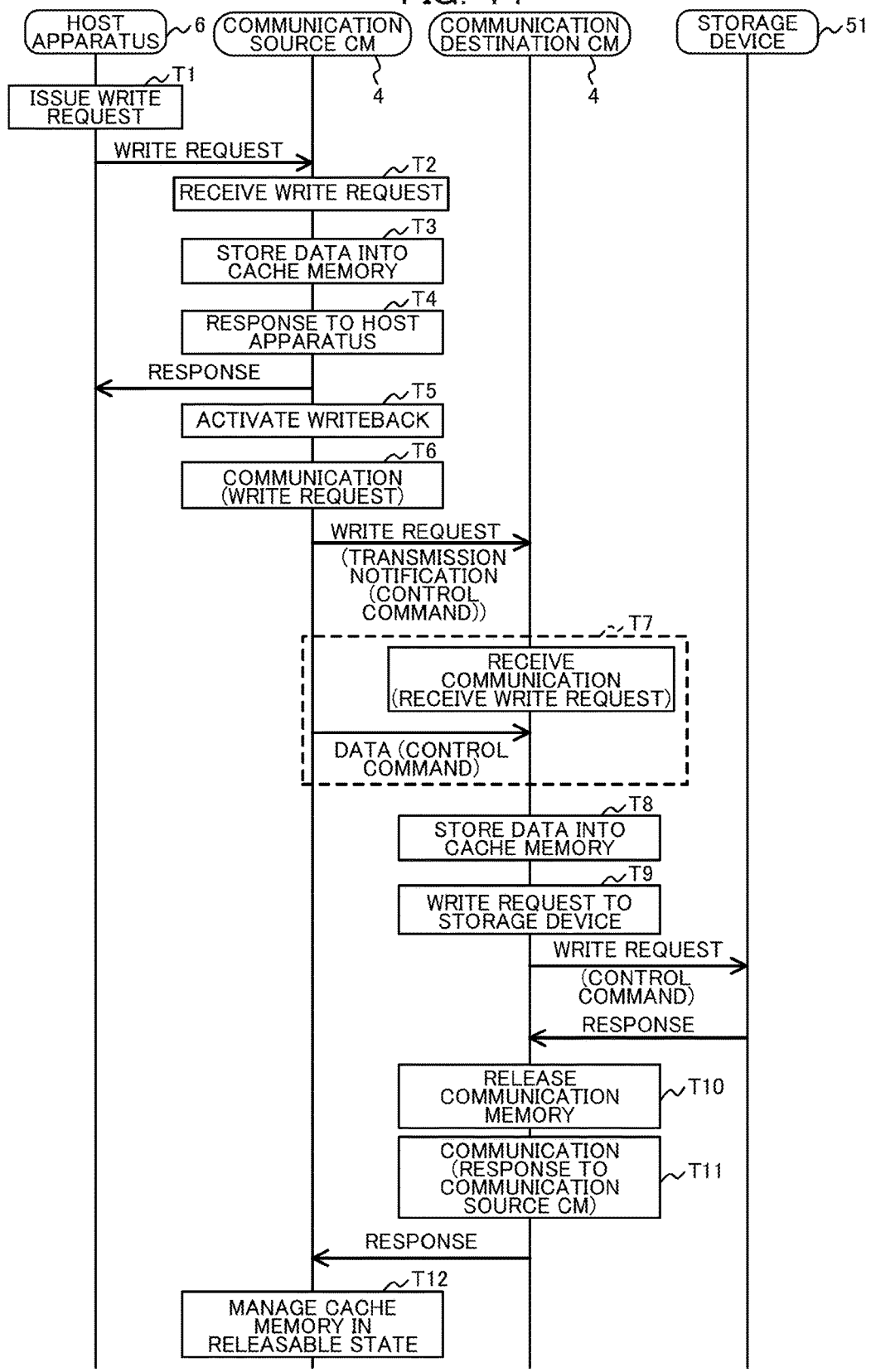
FIG. 11 is a sequence diagram illustrating an example of a procedure of the processes depicted in FIGS. 9 and 10.

First, a process of a CM 4 where a write request is issued from the host apparatus 6 is described with reference to FIGS. 9 to 11. FIGS. 9 and 10 are flow charts individually illustrating an example of a process of the communication source CM 4 and the communication destination CM 4 when a write request is issued from the host apparatus 6, and FIG. 11 is a sequence diagram illustrating an example of a procedure of the processes illustrated in FIGS. 9 and 10. It is to be noted that, in the following description of processing steps depicted in FIGS. 9 and 10, a corresponding processing sequence of FIG. 11 is occasionally described additionally.

As depicted in FIG. 9, if an access request (write request) is received from the host apparatus 6 (step S1; processes T1 and T2 of FIG. 11), then the host side communication unit 41 of the communication source CM 4 stores data 410 relating to the write request into the cache memory 40a (step S2; process T3). Further, when the CM 4 is to perform write back, the host side communication unit 41 returns a response to the host apparatus 6 (step S3; process T4).

Then, in accordance with the write request, the host side communication unit 41 activates a data transfer process (Writeback) to a device (for example, storage device 51) of an access destination from the cache memory 40a (step S4; process T5). In the data transfer process, the transfer decision unit 42 decides whether or not communication with a different CM 4 is to be performed based on the write request, disk group information 420 and logical volume information 430 (step S5).

If it is decided by the transfer decision unit 42 that communication with a different CM 4 is not to be performed (No at step S5), then this signifies that the storage device 51 of the access destination is connected to the communication source CM 4. In this case, transmission of the write request to the storage device 51 is performed by generating the control command 440 by the command generation unit 43 and issuing the control command 440 to the storage device 51 by the device side communication unit 45 (step S6). Thereafter, the processing advances to step S8.

On the other hand, if it is decided by the transfer decision unit 42 that communication with a different CM 4 is to be performed (Yes at step S5), then this signifies that the storage device 51 of the access destination is not connected to the communication source CM 4. In this case, the transfer decision unit 42 specifies the communication source CM 4 to which the storage device 51 of the access destination is connected. Then, the command generation unit 43 generates the control command 440 and the CM side communication unit 44 performs communication with the communication destination CM 4 (a write request (transmission notification) is transmitted) (step S7; process T6). At this time, the CM side communication unit 44 may include the control command 440 in the transmission notification.

At step S7, the processing of the communication destination CM 4 is performed as depicted in FIG. 10. In particular, the CM side communication unit 44 of the communication destination CM 4 receives the write request transmitted from the communication source CM 4 (step S11; process T7).

In the reception of the write request, DMA transfer of write data may be performed between the communication source CM 4 and the communication destination CM 4.

Then, the CM side communication unit 44 stores the data 410 acquired from the communication source CM 4 as data 450 into the communication memory 40d (step S12; process T8). At this time, the CM side communication unit 44 may store also the acquired control command 440 into the command storage unit 40c.

Then, the CM side communication unit 44 performs notification to the device side communication unit 45 and the device side communication unit 45 transmits a write request (440) to the storage device 51 (step S13; process T9), and writing of the data 450 is performed by the storage device 51.

In this manner, in the processes T6 to T9 of FIG. 11, the communication source CM 4 may perform direct write instruction to the storage device 51 of the access destination by DMA transfer and thereby cause the storage device 51 to execute storage of the write data 410. At this time, before the data 410 is written into the storage device 51, the write data 410 (data 450) is temporarily stored into the communication memory 40d in the communication destination CM 4. In other words, a cache controlling unit for controlling access to the communication memory 40d of the communication destination CM 4 performs a write process of the write data 450 into the communication memory 40d, and the IOC 4g performs a write process of the write data 420 into the storage device 51 using the control command 440.

Consequently, the communication destination CM 4 may write the data 450 DMA-transferred thereto from the communication source CM 4 into the storage device 51 using the control command 440 generated by the communication source CM 4. In other words, the communication source CM 4 receiving the access request executes processing and control relating to the access request, and the communication destination CM 4 that is in charge of the storage device 51 of the access destination performs access to the storage device 51 of the communication destination CM 4 in place of the communication source CM 4.

When a response from the storage device 51 is received, the device side communication unit 45 performs notification of the response to the CM side communication unit 44, and the CM side communication unit 44 releases (for example, manages in a releasable state) the communication memory 40d (step S14; process T10) and performs communication with (responds to) the communication source CM 4 (step S15; process T11). Then, the processing advances to the process at step S8 by the communication source CM 4 depicted in FIG. 9.

As depicted in FIG. 9, at step S8, in the communication source CM 4, the host side communication unit 41 manages the data 410 in the cache memory 40a in a releasable state based on the notification from the CM side communication unit 44 or the device side communication unit 45 (process T12), and the processing is ended therewith.

[1-4-2] Process for Read Request

Figure 12:
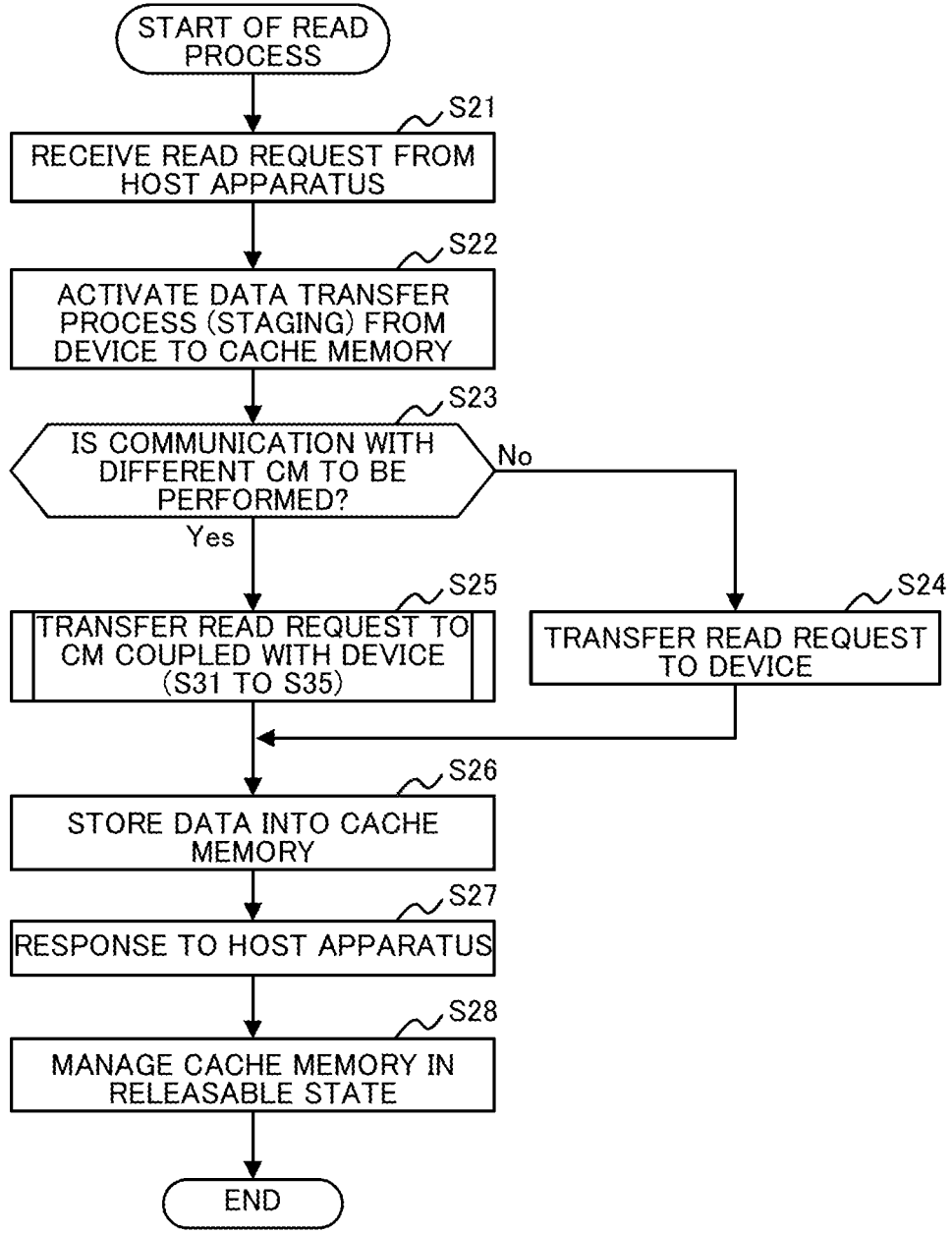
FIG. 12 is a flow chart illustrating an example of a process of the communication source CM when a read request is issued from the host apparatus.
Figure 13:
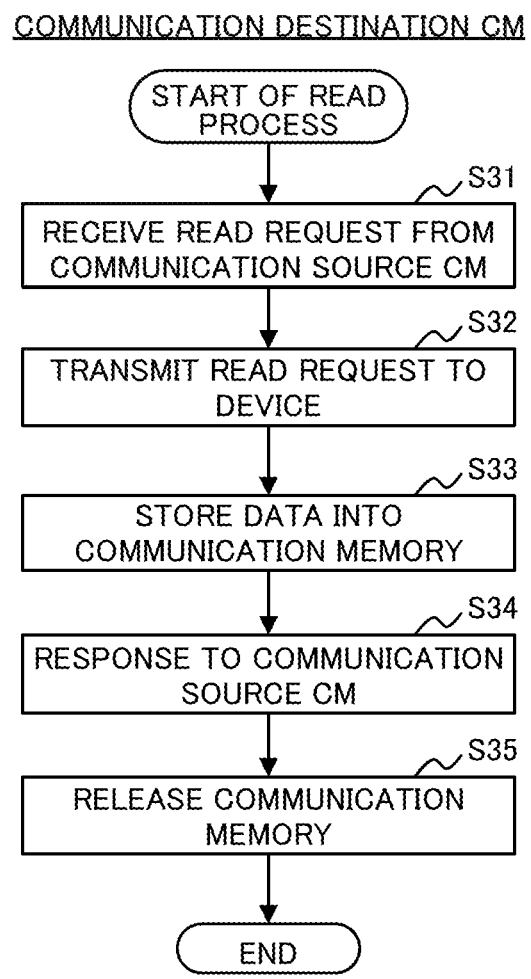
FIG. 13 is a flow chart illustrating an example of a process of the communication destination CM when a read request is issued from the host apparatus.
Figure 14:
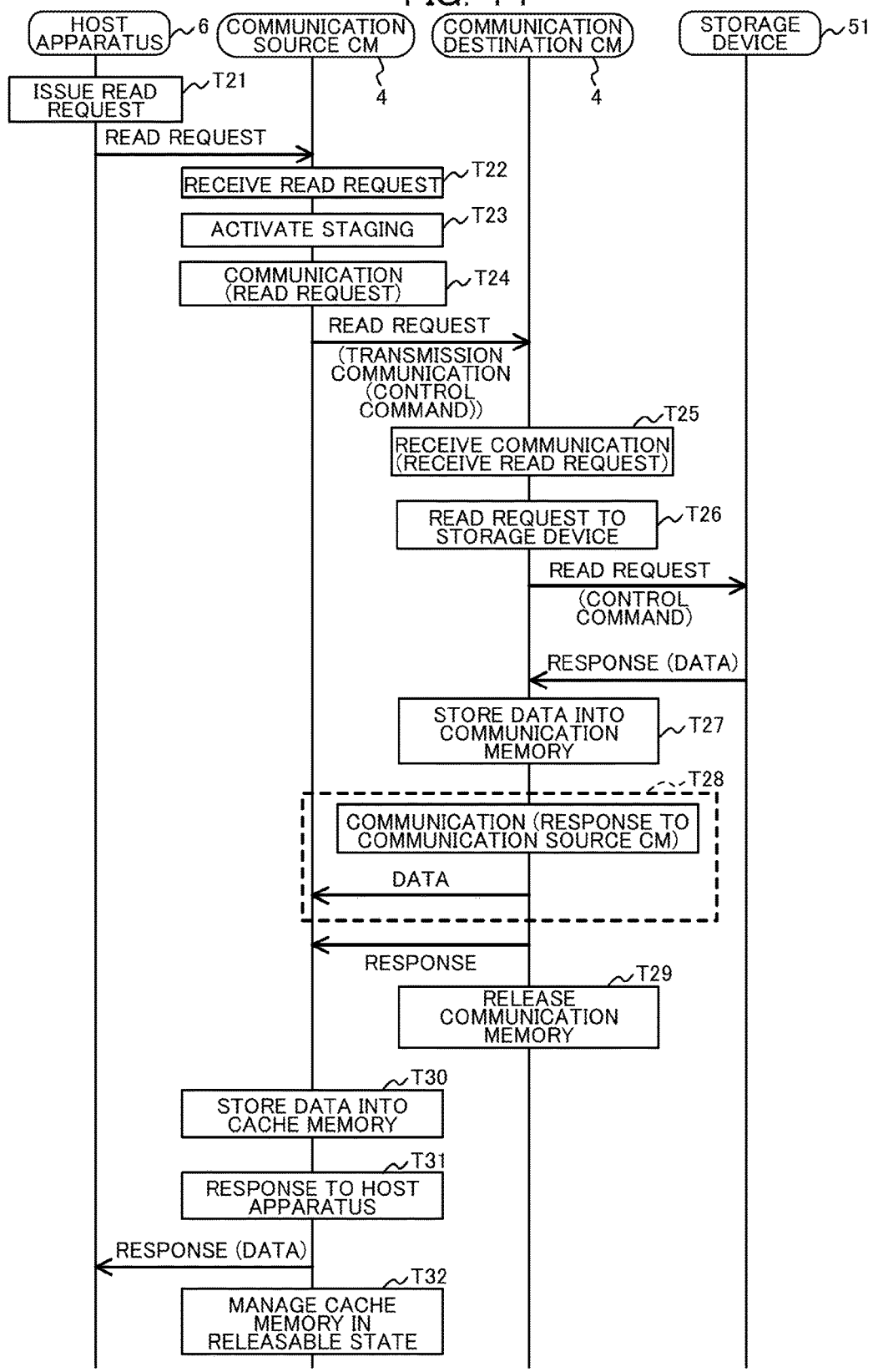
FIG. 14 is a sequence diagram illustrating an example of a procedure of the processes depicted in FIGS. 12 and 13.

Now, a process of a CM 4 when a read request is issued from the host apparatus 6 is described with reference to FIGS. 12 to 14. FIGS. 12 and 13 are flow charts illustrating an example of processes of the communication source CM 4 and the communication destination CM 4 when a read request is issued from the host apparatus 6, respectively. FIG. 14 is a sequence diagram illustrating an example of a procedure of the processes depicted in FIGS. 12 and 13. It is not be noted that, in the following description of the processing steps depicted in FIGS. 12 and 13, a corresponding processing sequence of FIG. 14 is occasionally described additionally.

As depicted in FIG. 12, the host side communication unit 41 of the communication source CM 4 receives an access request (read request) from the host apparatus 6 (step S21; processes T21 and T22 in FIG. 14). Then, the host side communication unit 41 activates a data transfer process (Staging) from the device of the access destination (for example, a storage device 51) to the cache memory 40a in accordance with the read request (step S22; process T23). In the data transfer process, the transfer decision unit 42 decides whether or not communication with a different CM 4 is to be performed based on the read request, write data 420 and logical volume information 430 (step S23).

If the transfer decision unit 42 decides that communication with a different CM 4 is not to be performed (No at step S23), then this signifies that the storage device 51 of the access destination is connected to the communication source CM 4. In this case, the command generation unit 43 generates a control command 440 and the device side communication unit 45 issues the control command 440 to the storage device 51 to perform transmission of the read request to the storage device 51 (step S24), whereafter the processing advances to step S26.

On the other hand, if the transfer decision unit 42 decides that communication with a different CM 4 is to be performed (Yes at step S23), then this signifies that the storage device 51 of the access destination is not connected to the communication source CM 4. In this case, the transfer decision unit 42 specifies the communication destination CM 4 to which the storage device 51 of the access destination is connected.

Then, the command generation unit 43 generates a control command 440 and the CM side communication unit 44 performs communication of the control command 440 with the communication destination CM 4 (transmits a read request (transmission notification)) (step S25; process T24). At this time, the CM side communication unit 44 may include the control command 440 in the transmission notification. Or, the CM side communication unit 44 of the communication source CM 4 may acquire the control command 440 by DMA transfer from the command storage unit 40c of the communication source CM 4.

At step S24, a process of the communication destination CM 4 is performed as depicted in FIG. 13. The CM side communication unit 44 of the communication destination CM 4 receives the read request transmitted from the communication source CM 4 at step S25 (step S31; process T25). At this time, the CM side communication unit 44 may store the acquired control command 440 into the command storage unit 40c.

Then, the CM side communication unit 44 performs notification to the device side communication unit 45 and the device side communication unit 45 transmits the read request (control command 440) to the storage device 51 (step S32; process T26). Thus, reading out of the read data is performed by the storage device 51.

When the device side communication unit 45 receives the response (read data) from the storage device 51, it stores the read data as data 450 into the communication memory 40d (step S33; process T27) and performs notification to the CM side communication unit 44.

The CM side communication unit 44 may write the read data, for example, into the cache memory 40a of the communication source CM 4 by DMA transfer through the relay apparatus 2 (step S34; process T28). When the transfer of the data 450 between the communication source CM 4 and the communication destination CM 4 is completed, the CM side communication unit 44 returns a response to the CM 4.

Then, the CM side communication unit 44 releases the communication memory 40d (for example, manages the communication memory 40d in a releasable state) (step S35; process T29), whereafter the processing advances to the process at step 26 by the communication source CM 4 depicted in FIG. 12.

As depicted in FIG. 12, at step S26, the CM side communication unit 44 or the device side communication unit 45 of the communication source CM 4 stores the read data acquired from the communication destination CM 4 or the storage device 51 as data 410 into the cache memory 40a (process T30). Then, the CM side communication unit 44 or the device side communication unit 45 notifies the host side communication unit 41 of completion of the process for the read request.

The host side communication unit 41 returns a response together with the read data to the host apparatus 6 based on the notification from the CM side communication unit 44 or the device side communication unit 45 (step S27; process T31). Then, the host side communication unit 41 manages the data 410 in the cache memory 40a in a releasable state (step S28; process T32), thereby ending the processing.

[1-5] Modifications

[1-5-1] First Modification

In the storage apparatus 1 according to the embodiment, the CM 4 may store a history of the access destination into the information storage unit 40 in regard to a read I/O and a write I/O requested from the communication source CM 4. In the modified storage apparatus, when an access request (read request) to a region same as the region of the access destination of the read I/O or the write I/O stored in the history is received from the communication source CM 4, the communication destination CM 4 may read out the pertaining data from the communication memory 40d without performing access to the storage device 51 and issue a response to the communication source CM 4.

For example, DMA includes a function for performing inquiry. Therefore, when the CM side communication unit 44 of the communication source CM 4 performs transmission notification in the transfer control, it may inquire the communication destination CM 4 about whether or not data corresponding to the read request is stored in the communication memory 40d using the inquiry function of DMA (can refer to the history to make a decision).

In other words, the CM side communication unit 44 of the communication source CM 4 may decide in regard to the communication destination CM 4 whether or not the read data requested by the read request is stored in the information storage unit 40 (communication memory 40d). Then, if it is decided that the read data is not stored in the communication memory 40d, the CM side communication unit 44 of the communication source CM 4 may instruct the communication destination CM 4 to access the storage device 51 of the access target based on the read request through the relay apparatus 2.

Consequently, if the read data is stored in the communication memory 40d, then the communication destination CM 4 may inhibit to perform the process from the transmission of a control command 440 to the storage device 51 relating to the read request to the reception of read data from the storage device 51 and can thereby achieve reduction of the processing time period. Accordingly, the I/O performance with regard to the host apparatus 6 can be improved.

[1-5-2] Second Modification

In the foregoing description, communication between CMs when an access request from the host apparatus 6 to a storage device 51 is received is described. However, the operation of the CMs described above is not limited to that in the case in which an access request is received from the host apparatus 6.

As described hereinabove, the DE 5 may include an IOM (not depicted) which may control access to a storage device 51 installed in the DE 5. In such a storage apparatus 1 as just described, the CM 4 may include a monitoring unit (not depicted) that performs monitoring of the DE 5. The monitoring unit may perform, for each IOM provided in each of a plurality of DEs 5, confirmation of presence or absence of an abnormal state (confirmation of life or death) of the IOM itself or a storage device 51 in the DE 5 from the CM 4.

It is to be noted that the CM 4 that performs access to an IOM ((performs monitoring of the IOM) may be a master CM 4 from among a plurality of CMs 4 in a plurality of CEs 3. The master CM 4 may perform various kinds of control relating to the storage apparatus 1 in response to a request from the host apparatus 6, the relay apparatus 2, a different CM 4 (slave CM 4) or the like.

The operation of the CM 4 described above may be applied similarly also to access to an IOM of the DEs 5 in which such a master CM 4 is a start point.

For example, when the master CM 4 (monitoring unit) performs access to an IOM, it may issue an access request and store the access request into the cache memory 40a. In this case, the decision process by the transfer decision unit 42 may be performed similarly to that described hereinabove in connection with the embodiment in response to a notification from the monitoring unit.

The command generation unit 43 is used to perform various kinds of communication and so forth from the CM 4 to an IOM and may generate a control command 440 in compliance with the specification used by the IOM, for example, a SCSI command and store the control command 440 into the command storage unit 40c. This control command 440 may include at least one of various control contents such as inquiry to the IOM, the address of the access destination and so forth.

The control command 440 generated by the command generation unit 43 may be transmitted to a different CM 4 or an IOM of the DE 5 connected to the master CM 4, through the CM side communication unit 44 or the device side communication unit 45 similarly as in the case described hereinabove in connection with the embodiment.

It is to be noted that monitoring information received together with a response from an IOM, for example, status information of the IOM or a storage device 51, may be stored as data 410 into the cache memory 40a by the CM side communication unit 44 or the device side communication unit 45, and a notification of completion of the response may be issued to the monitoring unit.

Consequently, also in the control of monitoring of the DE 5 by the master CM 4, similar effects to those achieved by the embodiment can be achieved.

[2] Others

Although the preferred embodiment and modifications of the present technology have been described in detail, the present technology is not limited to the specific embodiment and can be carried out in various modified or altered forms without departing from the spirit and scope of the present technology.

For example, the functional blocks of the CM 4 depicted in FIG. 5 may be integrated in arbitrary combinations or may be disintegrated arbitrarily.

Further, the number of CEs 3 and DEs 5 in the storage apparatus 1, the number of FRTs 21 in the relay apparatus 2, the number of IFs 4*d*-1 to 4*d*-3 in each CM 4 and the number of IOCs 4*g* and EXPs 4*h* in the IF 4*d*-3 are not limited to those described hereinabove. The numbers may be smaller or greater than those described in the foregoing description. Further, the number of cascade connections of DEs 5 are not limited to four but may be equal to or smaller than 3 or may be equal to or greater than 5.

According to the one aspect, the scalability can be enhanced while degradation of the availability of the storage apparatus is suppressed.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A control apparatus served as a first control apparatus comprising:
    a first information storage unit configured to store therein coupling information relating to a coupling relationship between a plurality of control apparatus and a plurality of devices, the plurality of control apparatus including the first control apparatus and controlling access from a host apparatus to the plurality of devices;
    a second information storage unit configured to store data relating to a communication between the plurality of control apparatus;
    a third information storage unit configured to store data relating to a communication between the host apparatus and the first control apparatus; and
    a processor in the first control apparatus configured to:
        specify, upon receipt of a first access request to a first device from among the plurality of devices, a control apparatus responsible for an access to the first device based on the coupling information stored in the first information storage unit;
        when the control apparatus responsible for the access to the first device is the first control apparatus, access to the first device based on the first access request received by the first control apparatus; and
        when the control apparatus responsible for the access to the first device is a second control apparatus, forward an instruction to access to the first device based on the first access request received by the first control apparatus to the second control apparatus through a relay apparatus that relays information to be transferred between the plurality of control apparatus and control data forwarding relating to the access, between the third information storage unit and a second information storage unit provided in the second control apparatus.

2. The control apparatus according to claim 1, wherein the third information storage unit further stores therein information based on the first access request;
    the information based on the first access request includes a control command, the control command being a control command to be transmitted from the second control apparatus to the first device and being generated in response to the first access request; and
    when the control apparatus responsible for the access to the first device is the second control apparatus, the processor
        generates the control command and stores the control command into the third information storage unit; and
        issues an instruction to access to the first device using the control command to the second control apparatus.

3. The control apparatus according to claim 1, wherein the first access request is issued from the host apparatus that performs access to a plurality of storage devices provided in each of the plurality of devices; and
    when first response data from the first device to the first access request is received from the second control apparatus through the relay apparatus, the processor stores the received first response data in the third information storage unit and transmits a result of response according to the first access request to the host apparatus.

4. The control apparatus according to claim 3, wherein the processor decides whether or not the first response data is stored in a second information storage unit provided in the second control apparatus, and, when it is decided that the first response data is not stored in the second information storage unit, the processor issues an instruction to access to the first device based on the first access request to the second control apparatus through the relay apparatus.

5. The control apparatus according to claim 1, wherein the processor:
    issues a second access request to a controller provided in the first device;
    receives second response data from the controller of the first device to the second access request from the second control apparatus through the relay apparatus; and
    performs monitoring of the first device based on the received second response data.

6. The control apparatus according to claim 1, wherein the third information storage unit further stores therein information based on the first access request;
    when the information based on the first access request includes writing data relating to the first access request and when the control apparatus responsible for the access to the first device is the second control apparatus, the processor directly forwards the writing data stored in the third information storage unit to the second information storage unit provided in the second control apparatus through the relay apparatus, and
    when the information based on the first access request includes reading request relating to the first access request and when the control apparatus responsible for the access to the first device is the second control apparatus, the processor controls the data forwarding, the data forwarding including directly forwarding reading data relating to the reading request stored in the second information storage unit provided in the second control apparatus to the third information storage unit through the relay apparatus.

7. The control apparatus according to claim 6, wherein the processor forwards the writing data or the reading data using Direct Memory Access (DMA) through the relay apparatus.

8. A storage apparatus, comprising:
a plurality of devices; and
a plurality of control apparatus configured to control access from a host apparatus to the plurality of devices;
a first control apparatus from among the plurality of control apparatus includes:
a first information storage unit configured to store coupling information relating to a coupling relationship between the plurality of control apparatus and the plurality of devices;
a second information storage unit configured to store data relating to a communication between the plurality of control apparatus;
a third information storage unit configured to store data relating to a communication between the host apparatus and the first control apparatus; and
a processor in the first control apparatus configured to:
specify, upon receipt of a first access request to a first device from among the plurality of devices, a control apparatus responsible for an access to the first device based on the coupling information stored in the first information storage unit;
when the control apparatus responsible for the access to the first device is the first control apparatus, access to the first device based on the first access request received by the first control apparatus; and
when the control apparatus responsible for the access to the first device is a second control apparatus, forward an instruction to access to the first device based on the first access request received by the first control apparatus to the second control apparatus through a relay apparatus that relays information to be transferred between the plurality of control apparatus and control data forwarding relating to the access, between the third information storage unit and a second information storage unit provided in the second control apparatus.

9. The storage apparatus according to claim 8, wherein the third information storage unit further stores information based on the first access request;
the information based on the first access request includes a control command, the control command being a control command to be transmitted from the second control apparatus to the first device and being generated in response to the first access request; and
when the control apparatus responsible for the access to the first device is the second control apparatus, the processor
generates the control command and stores the control command into the third information storage unit; and
issues an instruction to access to the first device using the control command to the second control apparatus.

10. The storage apparatus according to claim 8, wherein the first access request is issued from the host apparatus that performs access to a plurality of storage devices provided in each of the plurality of devices; and
when first response data from the first device to the first access request is received from the second control apparatus through the relay apparatus, the processor stores the received first response data in the third information storage unit and transmits a result of response according to the first access request to the host apparatus.

11. The storage apparatus according to claim 10, wherein the processor decides whether or not the first response data is stored in a second information storage unit provided in the second control apparatus, and, when it is decided that the first response data is not stored in the second information storage unit, the processor issues an instruction to access to the first device based on the first access request to the second control apparatus through the relay apparatus.

12. The storage apparatus according to claim 8, wherein the processor
issues a second access request to a controller provided in the first device;
receives second response data from the controller of the first device to the second access request from the second control apparatus through the relay apparatus; and
performs monitoring of the first device based on the received second response data.

13. The storage apparatus according to claim 8, wherein the third information storage unit further stores information based on the first access request;
when the information based on the first access request includes writing data relating to the first access request and when the control apparatus responsible for the access to the first device is the second control apparatus, the processor directly forwards the writing data stored in the third information storage unit to the second information storage unit provided in the second control apparatus through the relay apparatus, and
when the information based on the first access request includes reading request relating to the first access request and when the control apparatus responsible for the access to the first device is the second control apparatus, the processor controls the data forwarding, the data forwarding including directly forwarding reading data relating to the reading request stored in the second information storage unit provided in the second control apparatus to the third information storage unit through the relay apparatus.

14. The storage apparatus according to claim 13, wherein the processor forwards the writing data or the reading data using Direct Memory Access (DMA) through the relay apparatus.

15. A non-transitory computer-readable recording medium having stored therein a control program for causing a first computer to execute a process comprising:
controlling access from a host apparatus to a plurality of devices;
specifying, upon receipt of a first access request to a first device from among the plurality of devices, a computer responsible for an access to the first device based on the coupling information stored in a first information storage unit, the first information storage unit being configured to store coupling information relating to a coupling relationship between a plurality of computers and the plurality of devices, the plurality of computers including the first computer;
utilizing a second information storage unit to store data relating to a communication between the plurality of computers;
utilizing a third information storage unit to store data relating to a communication between the host apparatus and the first computer; and
when the computer responsible for the access to the first device is the first computer, accessing to the first device based on the first access request received by the first computer; and when the computer responsible for the access to the first device is a second computer, forwarding an instruction to access to the first device based on the first access request received by the first computer to the second computer through a relay apparatus that relays information to be transferred between the plurality of computers and controlling data forwarding relating to the access, between the third information storage unit and a second information storage unit provided in the second computer.

16. The non-transitory computer-readable recording medium having stored therein a control program according to claim 15, wherein
the third information storage unit further stores therein information based on the first access request;
the information based on the first access request includes a control command, the control command being a control command to be transmitted from the second computer to the first device and being generated in response to the first access request; and
when the computer responsible for the access to the first device is the second computer, the process further comprises:
generating the control command and storing the control command into the third information storage unit; and
issuing an instruction to access to the first device using the produced control command to the second computer.

17. The non-transitory computer-readable recording medium having stored therein a control program according to claim 15, wherein the first access request is issued from the host apparatus that performs access to a plurality of storage devices provided in each of the plurality of devices; and
the process further comprises:
receiving first response data from the first device to the first access request from the second computer through the relay apparatus;
storing the received first response data in the third information storage unit; and
transmitting a result of response according to the first access request to the host apparatus.

18. The non-transitory computer-readable recording medium having stored therein a control program according to claim 17, wherein the process further comprises:
deciding whether or not the first response data is stored in a second information storage unit provided in the second computer;
issuing, when it is decided that the first response data is not stored in the second information storage unit, an instruction to access to the first device based on the first access request to the second computer through the relay apparatus.

19. The non-transitory computer-readable recording medium having stored therein a control program according to claim 15, wherein the process further comprises:
issuing a second access request to a controller provided in the first device;
receiving second response data from the controller of the first device to the second access request from the second computer through the relay apparatus; and
performing monitoring of the first device based on the received second response data.

20. The non-transitory computer-readable recording medium having stored therein a control program according to claim 15, wherein the third information storage unit further stores therein information based on the first access request;
when the information based on the first access request includes writing data relating to the first access request and when the computer responsible for the access to the first device is the second computer, the process further comprises
directly forwarding the writing data stored in the third information storage unit to the second information storage unit provided in the second computer through the relay apparatus, and
when the information based on the first access request includes reading request relating to the first access request and when the computer responsible for the access to the first device is the second computer, the process further comprises
controlling the data forwarding, the data forwarding including directly forwarding reading data relating to the reading request stored in the second information storage unit provided in the second computer to the third information storage unit through the relay apparatus.

* * * * *